(12) United States Patent
Wakabayashi et al.

(10) Patent No.: US 8,962,716 B2
(45) Date of Patent: Feb. 24, 2015

(54) CURABLE COMPOSITION

(71) Applicant: Kaneka Corporation, Osaka-shi, Osaka (JP)

(72) Inventors: Katsuyu Wakabayashi, Settsu (JP); Katsuya Ouchi, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/722,461

(22) Filed: Dec. 20, 2012

(65) Prior Publication Data

US 2013/0116378 A1 May 9, 2013

Related U.S. Application Data

(62) Division of application No. 12/526,751, filed as application No. PCT/JP2008/052370 on Feb. 13, 2008.

(30) Foreign Application Priority Data

Feb. 13, 2007 (JP) ................. 2007-032074

(51) Int. Cl.
 *C08K 5/34* (2006.01)
 *C08L 83/04* (2006.01)

(52) U.S. Cl.
 USPC .............................. 524/86; 524/92

(58) Field of Classification Search
 USPC ............................. 524/237, 86, 92
 See application file for complete search history.

(56) References Cited

U.S. PATENT DOCUMENTS

| | | | |
|---|---|---|---|
| 4,837,401 | A | 6/1989 | Hirose et al. |
| 4,904,732 | A | 2/1990 | Iwahara et al. |
| 2002/0045126 | A1 | 4/2002 | Watanabe et al. |
| 2005/0008863 | A1 | 1/2005 | Mimura et al. |
| 2006/0189736 | A1 | 8/2006 | Mori et al. |
| 2007/0299214 | A1 | 12/2007 | Wakabayashi et al. |
| 2008/0269405 | A1 | 10/2008 | Okamoto et al. |

FOREIGN PATENT DOCUMENTS

| | | |
|---|---|---|
| EP | 0538881 A2 | 4/1993 |
| JP | 52-073998 A | 6/1977 |
| JP | 55-43119 A | 3/1980 |
| JP | 63-006041 A | 1/1988 |
| JP | 5-117519 A | 5/1993 |
| JP | 2005-54174 A | 3/2005 |
| JP | 2005-248175 A | 9/2005 |
| JP | 2006-052296 A | 2/2006 |
| JP | 2006-199721 A | 8/2006 |
| JP | 2006-199725 A | 8/2006 |
| JP | 2006-199730 A | 8/2006 |
| JP | 2006-199905 A | 8/2006 |
| JP | 2006-199906 A | 8/2006 |

OTHER PUBLICATIONS

International Search Report of PCT/JP2008/052370, mailing date of Apr. 22, 2008.
Notification of Transmittal of Translation of the International Preliminary Report on Patentability (Forms PCT/IB/338) of International Application No. PCT/JP2008/052370 mailed Aug. 27, 2009 with Forms PCT/IB/373, PCT/ISA/237.
Machine translation of JP2006-199730, Aug. 2006.
Machine translation of JP2006-199905, Aug. 2006.

*Primary Examiner* — John Uselding
(74) *Attorney, Agent, or Firm* — Westerman, Hattori, Daniels & Adrian, LLP

(57) ABSTRACT

An object of the present invention is to provide a curable composition which is made mainly of a polymer having one or more reactive silicon groups, has good curability even when filler is used while a non-organotin catalyst is used, and is further high in industrial practicability. The object is solved by a curable composition, comprising, as constituents, a polymer (A) having one or more reactive silicon groups on average per molecule thereof, the reactive silicon group(s) being (each) a group which can be crosslinked by forming a siloxane bond, a Lewis acid and/or derivative thereof (B), an amine compound (C), a compound (D) having a reactive silicon group, and filler (E), and obtained by mixing the constituents with each other.

14 Claims, No Drawings

US 8,962,716 B2

CURABLE COMPOSITION

CROSS-REFERENCE TO RELATED APPLICATION

This application is a Divisional of application Ser. No. 12/526,751, filed Aug. 11, 2009, which is a National Stage of PCT International Application No. PCT/JP2008/052370 filed on Feb. 13, 2008. The entire contents of each of the above documents in hereby incorporated by reference into the present application.

TECHNICAL FIELD

The present invention relates to a curable composition containing a polymer which has a hydroxyl group or a hydrolyzable group bonded to a silicon atom and has a group having silicon that can be crosslinked through formation of a siloxane bond (also referred to as a "reactive silicon group" hereinafter).

BACKGROUND ART

It is known that a polymer having at least one reactive silicon group in its molecule has a nature that the polymer is crosslinked through formation of siloxane bonds, which follows hydrolysis reaction or the like of the reactive silicon group due to moisture or the like, even at room temperature, so as to give a rubbery cured product.

Out of such polymers having a reactive silicon group, organic polymers having a main chain skeleton made of polyoxyalkylene based polymer or polyisobutylene based polymer are disclosed in JP-A-52-73998, JP-A-63-6041 and the like, and have already been industrially produced and have widely been used for sealants, adhesives, paints and the like. Curable compositions containing a polymer having a main chain skeleton made of polysiloxane, in particular, diorganopolysiloxane have also been reported in many documents such as JP-A-55-43119.

Curable compositions used for sealants, adhesives, paints and the like, and rubbery cured products obtained by curing the compositions are required to have various properties such as curability, adhesiveness, and mechanical properties.

Curable compositions containing a polymer having a reactive silicon group are cured by use of a curable catalyst. Usually, an organotin catalyst having a carbon-tin bond, such as dibutyltin bis(acetylacetonate) has widely been used. In recent years, however, about organotin compounds, the toxicity thereof has been pointed out. Thus, organotin-free catalysts have been desired to be developed.

Many researches have been made on metal carboxylates, metal alkoxides, and the like as organotin-free catalysts. Among them, carboxylic acids or amine compounds are catalysts containing no metal, and are expected to give only relatively small effects onto the environment. JP-A-05-117519 discloses that use of a combination of a carboxylic acid with an amine gives a curable composition having a good curability. However, in curable compositions which are cured by a silanol condensation catalyst in which an amine compound and a carboxylic acid are used in combination, the resultant cured products cannot easily gain a sufficient adhesiveness. Thus, some of the compositions are unsuitable for sealants, adhesives and the like. As stated in JP-A-05-117519, sufficient curability is not easily obtained by use of a silanol condensation catalyst containing an amine compound alone.

In the meantime, JP-A-2005-54174, JP-A-2006-52296, JP-A-2006-199721, JP-A-2006-199725, JP-A-2006-199730, JP-A-2006-199905 and JP-A-2006-199906 each disclose a curable composition using $BF_3$ or a complex thereof as a catalyst. However, even when the catalyst is used, there arises a problem that a sufficient curability cannot be obtained in the case of further using filler, or in some other case.

DISCLOSURE OF THE INVENTION

Problems to be Solved by the Invention

An object of the present invention is to provide a curable composition which is made mainly of a polymer having one or more reactive silicon groups, has good curability even when filler is used while a non-organotin catalyst is used, and is further high in industrial practicability.

Means for Solving the Problems

In order to solve such problems, the inventors have made eager investigations so as to complete the following inventions.

That is, the present intention relates to:

(I). a curable composition, comprising, as constituents,
a polymer (A) having one or more reactive silicon groups on average per molecule thereof, the reactive silicon group(s) being (each) a group which can be crosslinked by forming a siloxane bond,
a Lewis acid and/or derivative thereof (B),
an amine compound (C),
a compound (D) having a reactive silicon group represented by the general formula (1):

$$—SiR^1{}_{3-a}X_a \quad (1)$$

wherein $R^1$ or $R^1$s, the number of which is (3-a), is/are (each independently) a hydrocarbon group having 1 to 20 carbon atoms, X or Xs, the number of which is a, is/are (each independently) at least one selected from the group consisting of a hydroxyl group, an alkoxy group, an alkenyloxy group, an acyloxy group, a phenoxy group, and a siloxy group represented by $R^2{}_3SiO$— wherein three $R^2$s are each independently a hydrocarbon group having 1 to 20 carbon atoms, and a is any one of 1, 2 and 3, and
filler (E), and
obtained by mixing the constituents with each other, (II). the curable composition according to (I), wherein the reactive silicon group(s) present in the polymer (A) is/are (each) a reactive silicon group represented by the general formula (2):

$$—SiR^3{}_{3-b}Y_b \quad (2)$$

wherein $R^3$ or $R^3$s, the number of which is (3-b), is/are (each independently) a hydrocarbon group having 1 to 20 carbon atoms, Y or Ys, the number of which is b, is/are (each independently) at least one selected from the group consisting of a hydroxyl group, an alkoxy group, an alkenyloxy group, an acyloxy group, a phenoxy group, and a siloxy group represented by $R^2{}_3SiO$— wherein three $R^2$s are each independently a hydrocarbon group having 1 to 20 carbon atoms, and b is any one of 1, 2 and 3, (III). the curable composition according to (II), wherein b in the general formula (2) is 2, (IV). the curable composition according to any one of (I) to (III), wherein the polymer (A) having one or more reactive silicon groups is a polymer having a number-average molecular weight of 3,000 to 100,000, (V). the curable composition according to anyone of (I) to (IV), wherein the main chain skeleton of the polymer (A)

having one or more reactive silicon groups is at least one selected from the group consisting of a polyoxyalkylene based polymer, a saturated hydrocarbon based polymer, and a (meth)acrylate based polymer, (VI). the curable composition according to any one of (II) to (V), wherein Y(s) in the general formula (2) is/are (each) an alkoxy group, (VII). the curable composition according to any one of (II) to (V), wherein Y(s) in the general formula (2) is/are (each) a methoxy group, (VIII). the curable composition according to any one of (I) to (VII), wherein the Lewis acid and/or derivative thereof (B) is $BF_3$ and/or a complex thereof, (IX). the curable composition according to any one of (I) to (VIII), wherein the amine compound (C) is an aryl-substituted guanidine compound and/or an aryl-substituted biguanide compound, (X). the curable composition according to anyone of (I) to (IX), wherein a in the general formula (1) is 3, (XI). the curable composition according to any one of (I) to (X), wherein the molecular weight of the compound (D) having a reactive silicon group is 3,000 or less, (XII). the curable composition according to any one of (I) to (XI), wherein X(s) in the general formula (1) is/are (each) an alkoxy group, (XIII). the curable composition according to any one of (I) to (XII), wherein the amount of X(s) (described in the general formula (1)) present in the compound (D) having a reactive silicon group is 5 mmol/g or more on average, (XIV). the curable composition according to any one of (I) to (XIII), wherein the filler (E) is precipitated calcium carbonate which is surface-treated with an aliphatic acid and/or an aliphatic acid salt, (XV). the curable composition according to any one of (I) to (XIV), which is obtained by mixing constituents containing at least the polymer (A) having one or more reactive silicon groups and/or the compound (D) having a reactive silicon group, and the Lewis acid and/or derivative (B) with each other in advance, and then mixing this mixture with other constituent(s) containing at least the filler (E), (XVI). the curable composition according to (XV), which is obtained by mixing constituents containing at least the polymer (A) having one or more reactive silicon groups and/or the compound (D) having a reactive silicon group, and the Lewis acid and/or derivative thereof (B) with each other in advance in the absence of the filler (E), and then mixing this mixture with other constituent(s) containing at least the filler (E), (XVII). the curable composition according to any one of (I) to (XIV), which is obtained by mixing constituents containing at least the polymer (A) and the filler (E) with each other in advance, and then mixing this mixture with other constituent(s) containing at least the Lewis acid and/or derivative thereof (B), (XVIII). the curable composition according to any one of (I) to (XVII), which is produced through a process containing a step of heating the curable composition at a temperature of 40° C. or higher, (XIX). a sealant wherein the curable composition as recited in any one of (I) to (XVIII) is used, and (XX). an adhesive wherein the curable composition as recited in any one of (I) to (XVIII) is used.

Effect of the Invention

The curable composition of the present invention has good curability even when filler is used while a non-organotin catalyst is used.

BEST MODE FOR CARRYING OUT THE INVENTION

The present invention will be described in detail hereinafter.

The curable composition of the present invention contains, as an essential component, a polymer (A) having one or more reactive silicon groups (hereinafter, it may be referred to as polymer (A) in some cases).

The polymer (A) has one or more reactive silicon groups on average per molecule thereof. The reactive silicon group is an organic group having a hydroxyl group or hydrolyzable group bonded to a silicon atom. The polymer (A) having one or more reactive silicon groups has a characteristic that a siloxane bond is formed therein by a reaction accelerated by a silanol condensation catalyst so that the polymer (A) is crosslinked.

The reactive silicon group may be, for example, a silicon group represented by the following:

$$-SiR^3{}_{3-b}Y_b \qquad (2)$$

wherein $R^3$ or $R^3$s, the number of which is (3-b), is/are (each independently) a hydrocarbon group having 1 to 20 carbon atoms, Y or Ys, the number of which is b, is/are (each independently) at least one selected from the group consisting of a hydroxyl group, an alkoxy group, an alkenyloxy group, an acyloxy group, a phenoxy group, or a siloxy group represented by $R^2{}_3SiO-$ wherein three $R^2$s are each independently a hydrocarbon group having 1 to 20 carbon atoms, and b is any one of 1, 2 and 3.

In the curable composition of the present invention, the polymer (A) having one or more reactive silicon groups is used as a main component. The polymer (A) is more preferably a compound having a main chain skeleton made of an organic polymer than any compound in which an inorganic polymer such as polydimethylsiloxane is used as a main component mainly since the former compound is good in compatibility with components other than the polymer (A) having one or more reactive silicon groups (for example, the components (B), (C) and (D)). Moreover, the curable composition including the polymer (A) having a main chain skeleton made of an organic polymer is excellent in curability and the cured product obtained therefrom has a characteristic of being excellent in adhesive property.

For the same reasons, the main chain skeleton of the polymer (A) is preferably made of one or more selected from hydrogen, carbon, nitrogen, oxygen or sulfur atoms.

The main chain skeleton of the polymer (A) is not particularly limited to. Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene based copolymer, polyisobutylene, copolymer made from isobutylene and isoprene or the like, polychloroprene, polyisoprene, copolymer made from isoprene or butadiene, and acrylonitrile and/or styrene or the like, polybutadiene, copolymer made from isoprene or butadiene, and acrylonitrile and styrene or the like, hydrogenated polyolefin polymers obtained by hydrogenating these polyolefin polymers, and other hydrocarbon polymers; polyester polymers each obtained by condensing between a dibasic acid such as adipic acid and glycol, or by ring-opening-polymerizing a lactone; (meth)acrylate polymers each obtained by radical-polymerizing ethyl(meth) acrylate, butyl(meth)acrylate, or some other monomer; vinyl polymers each obtained by radical-polymerizing a compound such as a (meth)acrylate compound, vinyl acetate, acrylonitrile, styrene and some other monomer; graft polymers each obtained by polymerizing the vinyl compound in any one of the above-mentioned polymers; polysulfide polymers; polyamide polymers such as polyamide 6 obtained by ring-opening-polymerizing ε-caprolactam, polyamide 6,6 obtained by polycondensing hexamethylenediamine and adipic acid, polyamide 6,10 obtained by polycondensing hexamethylenediamine and sebacic acid, polyamide 11 obtained by polycondensing ε-aminoundecanoic acid, polyamide 12 obtained by ring-opening-polymerizing ε-aminolaurolactam, copolymer polyamides each having two or more components out of the above-mentioned polyamides, and other polyamide polymers; polycarbonate polymers produced by polycondensing bisphenol A and carbonyl chloride; diallyl phthalate polymers; and other organic polymers. As the main chain skeleton other than an organic polymer, polysiloxane based polymers such as polydiorganosiloxane can also be used.

Among them, more preferred are saturated hydrocarbon polymers such as polyisobutylene, hydrogenated polyisoprene and hydrogenated polybutadiene, the polyoxyalkylene based polymers, the (meth)acrylate polymers, and the polysiloxane based polymers since the polymer (A) having these as the main chain skeleton thereof has a relatively low glass transition temperature and gives a cured product excellent in cold resistance.

The glass transition temperature of the polymer (A) having one or more reactive silicon groups is not particularly limited to, and is preferably 20 C or lower, more preferably 0 C or lower, in particular preferably −20 C or lower. If the glass transition temperature is higher than 20 C, the viscosity of the curable composition becomes high in winter or in cold districts so that the workability may deteriorate. Moreover, the flexibility of the cured product to be obtained falls so that the elongation may lower. The glass transition temperature can be obtained by DSC measurement in conformity with JIS K7121.

In the case of using, as an adhesive or sealant, the curable composition made mainly of the polymer (A) having, in its main chain skeleton, a saturated hydrocarbon based polymer, a polyoxyalkylene based polymer and a (meth)acrylate based polymer, the bleed of low molecular weight components to an adherend (contamination), and others are less generated. Thus, the case is more preferred.

The polymer (A) having, in its main chain skeleton, a polyoxyalkylene based polymer and a (meth)acrylate based polymer is high in moisture permeability. Thus, in the case of using the polymer (A) as a main component of a one-part-type adhesive, a sealant or the like, excellent depth curability is obtained. The cured product obtained therefrom is excellent in adhesive property. Thus, the case is particularly preferred. The polymer (A) having, in its main chain skeleton, a polyoxyalkylene based polymer is most preferred.

The polyoxyalkylene based polymer used as the main chain skeleton of the polymer (A) is a polymer having repeating units each represented by the general formula (3):

—R$^4$—O—      (3)

wherein R$^4$ is a linear or branched alkylene group having 1 to 14 carbon atoms.

R$^4$ in the general formula (3) is not particularly limited as far as R$^4$ is a linear or branched alkylene having 1 to 14 carbon atoms. R$^4$ is in particular preferably a linear or branched alkylene having 2 to 4 carbon atoms.

A repeating unit of the general formula (3) is not particularly limited to and includes, for example:

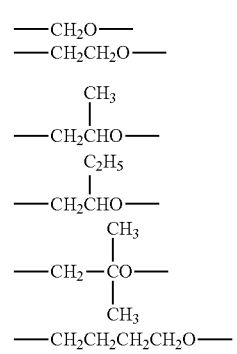

[Formula 1]

The polyoxyalkylene polymer may be made of only one kind of repeating unit, or may be made of two or more kinds of repeating units. In the case that the composition is used, in particular, for a sealant, a polymer (A) made mainly of a propylene oxide polymer as the main chain skeleton is preferred since the polymer is amorphous and has a relatively low viscosity.

Examples of the method for synthesizing the polyoxyalkylene polymer include a method based on an alkali catalyst such as KOH, a method using, as a catalyst, a transition metal compound/porphyrin complex catalyst obtained by reaction between an organic aluminum compound and porphyrin, as described in JP-A-61-215623, a method using, as a catalyst, a double metal cyanide complex, as described in JP-B-46-27250, JP-B-59-15336, and U.S. Pat. Nos. 3,278,457, 3,278, 458, 3,278,459, 3,427,256, 3,427,334, 3,427,335, and other publications; a polymerization method using a catalyst made of a polyphosphazene salt, as exemplified in JP-A-10-273512; and a method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polymers having a high molecular weight (number-average molecular weight of 6,000 or more) and a narrow molecular weight distribution (Mw/Mn of 1.6 or less) as suggested in JP-A-61-197631, 61-215622, 61-215623, 61-218632, 3-72527, 3-47825, and 8-231707. However, the method is not particularly limited thereto and a known method may be used.

Regarding the polyoxyalkylene based polymer having one or more reactive silicon groups, at the time of incorporating the polymer into the curable composition, only a single kind thereof may be incorporated or a combination of plural kinds thereof may be incorporated.

The saturated hydrocarbon based polymer used as the main chain skeleton of the polymer (A) is a polymer which does not substantially have, in the molecule thereof, a carbon-carbon unsaturated bond other than any aromatic ring. The polymer has a characteristic of being excellent in heat resistance, weather resistance, durability, and moisture blocking property.

The saturated hydrocarbon based polymer is not particularly limited, and examples thereof includes: (i) a polymer composed of repeating units each made of an olefin compound having 2 to 6 carbon atoms, such as ethylene, propylene, 1-butene or isobutylene; (ii) a polymer composed of repeating units each made of a diene compound, such as butadiene or isoprene; (iii) a polymer obtained by a method of copolymerizing the diene compound as described above with the olefin compound as described above, and then hydrogenating the resultant, or some other method; or the like. In particular, an isobutylene based polymer or a hydrogenated polybutadiene based polymer is preferred since a functional group is easily introduced into its terminal, the molecular weight is easily controlled, the number of terminal functional groups can be adjusted, and other advantages are produced. The isobutylene based polymer is more preferred.

The isobutylene polymers may each be a polymer wherein all of their repeating units are isobutylene units, or a copolymer made from isobutylene units and a different compound. Since the rubbery characteristics of the obtained curable composition is excellent when an isobutylene polymer is used as the main chain skeleton, the repeating units originating from isobutylene are contained in the polymer, on an average per molecule, preferably in an amount of 50% or more by weight, more preferably in an amount of 80% or more by weight, in particular preferably in an amount of 90 to 99%.

The method for synthesizing the saturated hydrocarbon polymer is not particularly limited to; hitherto various polymerization methods have been reported. Among them, living polymerizations which have been developed in recent years are preferred. For example, the following methods can be used as a method for synthesizing an isobutylene polymer; inifer polymerization found out by Kennedy et al. (J. P. Kennedy et al., J. Polymer Sci., Polymer Chem. Ed. 1997, vol. 15, 2843). By the polymerization method, various functional groups can be introduced into a terminal of the molecule, a molecular weight of the obtained isobutylene polymer is about 500 to 100,000 and a molecular weight distribution thereof is 1.5 or less.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-53882, and other publications. However, the method is not particularly limited thereto.

Regarding the saturated hydrocarbon based polymer having one or more reactive silicon groups, at the time of incorporating the polymer into the curable composition, only a single kind thereof may be incorporated or a combination of plural kinds thereof may be incorporated.

The (meth)acrylate based polymer used as the main chain skeleton of the polymer (A) is a polymer composed of repeating units each made of a (meth)acrylate based compound. The wording "(meth)acrylate" denotes acrylate and/or methacrylate. In the following description, the wording has the same meaning.

The (meth)acrylate compound which is used as a repeating unit is not particularly limited to, and various compounds can be used. Examples thereof include (meth)acrylic acid based monomers such as (meth)acrylic acid, methyl(meth)acrylate, ethyl(meth)acrylate, n-propyl(meth)acrylate, isopropyl (meth)acrylate, n-butyl(meth)acrylate, isobutyl(meth)acrylate, tert-butyl(meth)acrylate, n-pentyl(meth)acrylate, n-hexyl(meth)acrylate, cyclohexyl(meth)acrylate, n-heptyl (meth)acrylate, n-octyl(meth)acrylate, 2-ethylhexyl(meth) acrylate, nonyl(meth)acrylate, decyl(meth)acrylate, dodecyl (meth)acrylate, phenyl(meth)acrylate, tolyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, γ-(methacryloyloxypropyl)trimethoxysilane, γ-(methacryloyloxypropyl)dimethoxymethylsilane, an ethylene oxide adduct of (meth)acrylic acid, trifluoromethylmethyl(meth)acrylate, 2-trifluoromethylethyl (meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethylmethyl)(meth)acrylate, 2-trifluoromethyl-2-perfluoroethylethyl(meth)acrylate, 2-perfluorohexylethyl(meth)acrylate, 2-perfluorodecylethyl(meth)acrylate, 2-perfuorohexadecylethyl(meth)acrylate and the like.

In the (meth)acrylate polymers, any (meth)acrylate compound may be copolymerized with a vinyl compound, which will be described hereinafter. Examples of the vinyl compound which may be copolymerized with (meth)acrylate compounds include, for example, styrene compounds such as styrene, vinyltoluene, α-methylstyrene, chlorostyrene, styrenesulfonic acid and salts thereof, and the like; silicon-containing vinyl compounds such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide compounds such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl compounds such as acrylonitrile, methacrylonitrile and the like; amide-group-containing vinyl compounds such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like. Plural ones thereof may be copolymerized.

Among (meth)acrylate polymers obtained from the above compounds, a polymer (A) having, as its main chain skeleton, a copolymer composed of a styrene based compound and a (meth)acrylic acid based compound is preferred since a cured product excellent in physical properties can be obtained. More preferred is a polymer (A) having, as its main chain skeleton, a copolymer composed of an acrylate based compound and a methacrylate based compound. Particularly preferred is a polymer having, as its main chain skeleton, a polymer composed of an acrylate based compound.

When the curable composition is used for ordinary building or the like, it is required that the curable composition has low viscosity and the resultant cured product has low modulus, high elongation, weather resistance, heat resistance, and the like.

As the composition satisfying these requirements, more preferred is a composition wherein the main chain skeleton of the polymer (A) is a structure composed of butyl acrylate based compounds.

On the other hand, when the curable composition is used for automobiles or the like, the resultant cured product is required to be excellent in oil resistance or the like.

The curable composition in which the resultant cured product is excellent in oil resistance is more preferably a composition wherein the main chain skeleton of the polymer (A) is a copolymer composed mainly of ethyl acrylate.

In this curable composition, which has the polymer (A) containing, as its main chain skeleton, a copolymer composed mainly of ethyl acrylate, the resultant cured product is excellent in oil resistance, but tends to be slightly poor in low temperature property (cold resistance). In order to improve the low temperature property, a part of ethyl acrylate is represented by butyl acrylate. However, as a ratio of butyl acrylate is made larger, the good oil resistance tends to be further damaged. For this reason, when the composition is used for an application required to have oil resistance, the ratio is set preferably to be 40% or less, and more preferably to be 30% or less.

In order to improve the low-temperature property and the like without damaging the oil resistance, it is also preferred to use, as a copolymer component, a component wherein oxygen is introduced into an alkyl group of its side chain, such as 2-methoxyethyl acrylate and 2-ethoxyethyl acrylate.

However, when the alkoxy group, which has an ether bond, is introduced into the side chain, the resultant cured product tends to be poor in heat resistance, and therefore, when the composition is used for an application required to have heat resistance, the ratio of butyl acrylate is set preferably to be 40% or less.

In the light of various application or purposes to be required, considering physical properties such as oil resistance, heat resistance and low-temperature property to be required, an appropriate polymer can be obtained as the polymer (A) containing, as its main chain skeleton, a copolymer composed mainly of ethyl acrylate, by varying the ratio of copolymer components, considering physical properties such as oil resistance, heat resistance and low-temperature property to be required. An example excellent in the balance between physical properties such as oil resistance, heat resistance and low temperature property includes, but is not limited to, a copolymer composed of ethyl acrylate, butyl acrylate and 2-methoxyethyl acrylate (ratio by weight: 40-50/20-30/30-20).

In the present invention, these preferred compounds may each be copolymerized or block-copolymerized with a different compound. At this time, these preferred compounds are preferably contained in an amount of 40% or more by weight. A method for producing a (meth)acrylate based polymer is not particularly limited, and includes known methods. Of these methods, living radical polymerization is preferably used since crosslinkable functional groups are easily introduced at a high ratio into terminals of the molecular chains, and a polymer having a narrow molecular weight distribution and low viscosity is obtained, and others advantages are produced. A polymer obtained by ordinary free radical polymerization using an azo compound, peroxide or the like as a polymerization initiator generally has a molecular weight distribution value of 2 or more so that the polymer tends to have high viscosity.

Of methods for producing a (meth)acrylate based polymer using the "living radical polymerization", "atom transfer radical polymerization", wherein an organic halide, halogenated sulfonyl compound, or the like is used as an initiator and a transition metal complex is used as a catalyst, is more preferred as a method for producing a (meth)acrylate based polymer having a specific functional group since the method has not only a characteristic that "living radical polymerization" that a polymer having a narrow molecular weight distribution and low viscosity can be obtained, but also characteristics that: a degree that the initiator or the catalyst can freely be selected is large; the polymer has, at its terminal, a halogen or some other material that is relatively favorable for functional-group-converting reaction; and other advantages are produced.

Examples of the atom transfer radical polymerization include those described in Matyjaszewski et al., J. Am. Chem. Soc., 1995, vol. 117, page 5614.

A method for producing a (meth)acrylate based polymer having one or more reactive silicon groups is not particularly limited. Examples of the method include free radical polymerization disclosed in JP-B (Japanese Examined Patent Publication)-3-14068, JP-B-4-55444, JP-A (Japanese Unexamined Patent Publication)-6-211922 or the like, wherein a chain transfer agent is used; or atom transfer radical polymerization disclosed in JP-A-9-272714 or the like.

A (meth)acrylate based copolymer made from two or more of the above-mentioned (meth)acrylate based compounds may be used as the main chain skeleton of the polymer (A).

A specific example of the (meth)acrylate based copolymer made from plural (meth)acrylates based compounds is a copolymer having a main chain skeleton composed substantially of: repeating units each having an alkyl group having 1 to 8 carbon atoms and each represented by the general formula (4):

$$—CH_2—C(R^5)(COOR^6)— \quad (4)$$

wherein $R^5$ represents a hydrogen atom or a methyl group, and $R^6$ represents an alkyl group having 1 to 8 carbon atoms; and repeating units each having an alkyl group having 9 or more carbon atoms and each represented by the general formula (5):

$$—CH_2—C(R^5)(COOR^7)— \quad (5)$$

wherein $R^5$ is the same as in the general formula (4), and $R^7$ represents an alkyl group having 9 or more carbon atoms.

In the general formula (4), $R^6$ is not limited as far as $R^6$ is an alkyl group having 1 to 8 carbon atoms. Examples thereof include such as methyl, ethyl, propyl, n-butyl, t-butyl and 2-ethylhexyl groups. Of the groups, alkyl groups each having 1 to 4 carbon atoms are preferred. $R^6$s contained in the copolymer are not necessarily limited to a single alkyl group.

In the general formula (5), $R^7$ is not limited as far as $R^7$ is an alkyl group having 9 or more carbon atoms. Examples thereof include such as lauryl, tridecyl, cetyl, stearyl, and behenyl groups. Of the groups, alkyl groups each having 10 to 30 carbon atoms are preferred, and long-chain alkyl groups each having 10 to 20 are more preferred. $R^7$s contained in the copolymer are not necessarily limited to a single alkyl group. The (meth)acrylate based copolymer is composed substantially of repeating units represented by the general formulae (4) and (5). The word "substantially" means that the proportion of the total amount of the repeating units represented by the general formulae (4) and (5) contained in the copolymer is more than 50% by weight. The proportion of the total amount of the repeating units represented by the general formulae (4) and (5) contained in the copolymer is preferably 70% or more by weight.

Regarding the ratio between the repeating units of the general formulae (4) and (5) present in the copolymer, the ratio by weight of the general formula (4) to the general formula (5) is preferably from 95/5 to 40/60, more preferably from 90/10 to 60/40.

Examples of the (meth)acrylate based copolymer include a (meth)acrylate based compound used as a repeating unit of the general formula (4) or (5) and a vinyl compound copolymerizable with this compound.

Examples of the vinyl compound include acrylic acids such as acrylic acid and methacrylic acid; compounds each having an amide group, such as acrylamide, methacrylamide, N-methylolacrylamide, and N-methylolmethacrylamide, an epoxy group, such as glycidyl acrylate, and glycidyl methacrylate, and an amino group, such as diethylaminoethyl acrylate, diethylaminoethyl methacrylate, and aminoethyl vinyl ether; and other compounds, such as acrylonitrile, styrene, -methylstyrene, alkyl vinyl ethers, vinyl chloride, vinyl acetate, vinyl propionate, and ethylene.

Plural polymers (A), the main chain skeletons of which are organic polymers of different types may be used in a mixture form, examples of the polymers including a polyoxyalkylene based polymer having one or more reactive silicon groups; a saturated hydrocarbon based polymer having one or more reactive silicon groups; and a (meth)acrylate based polymer having one or more reactive silicon groups.

A method for producing a polymer wherein a polyoxyalkylene based polymer having one or more reactive silicon groups and a (meth)acrylate based polymer having one or more reactive silicon groups are mixed with each other is not particularly limited, and examples thereof include a method disclosed in, for example, JP-A-59-122541, JP-A-63-112642, JP-A-6-172631 or JP-A-11-116763.

A polymer wherein a saturated hydrocarbon based polymer having one or more reactive silicon groups and a (meth)acrylate based polymer having one or more reactive silicon groups are mixed with each other is not particularly limited, and examples thereof include a polymer disclosed in, for example, JP-A-1-168764, or JP-A-2000-186176.

A method for producing a polymer wherein a (meth)acrylate based copolymer having one or more reactive silicon groups is mixed is not particularly limited, and examples thereof include a method of polymerizing a (meth)acrylate based compound in the presence of a polymer having one or more reactive silicon groups, the method being disclosed in, for example, JP-A-59-78223, JP-A-59-168014, JP-A-60-228516, JP-A-60-228517, or the like.

If necessary, the main chain skeleton of the polymer (A) may contain repeating units other than the above-mentioned units, for example, repeating units each having a urethane bond as far as the effect of the present invention is not largely impaired.

The repeating unit having a urethane bond is not particularly limited, and examples thereof include a repeating unit having a group produced by reaction between an isocyanate group and an active hydrogen group (the produced group may be referred to as an amide segment hereinafter).

The amide segment is an organic group represented by the general formula (6):

$$—NR^8—C(=O)— \qquad (6)$$

wherein $R^8$ represents a hydrogen atom or an organic group.

The amide segment is not particularly limited, and examples thereof include such as a urethane group produced by reaction between an isocyanate group and a hydroxyl group; a urea group produced by reaction between an isocyanate group and an amino group; and a tiourethane group produced by reaction between an isocyanate group and a mercapto group.

In the present invention, any organic group produced by reaction between active hydrogen in a urethane group, a urea group and a thiourethane group, and an isocyanate group is also defined as an amide segment.

A method for producing the polymer (A) having one or more reactive silicon groups wherein its main chain skeleton has an amide segment is not particularly limited, and examples thereof include a method of causing a polymer having an organic group having, at its terminal, active hydrogen to react with a polyisocyanate compound in an excessive amount to yield a polymer wherein a polyurethane based main chain has, at its terminals, isocyanate groups, and subsequently or simultaneously causing the whole amount or a partial amount of the isocyanate groups in the polymer to reacted with U in a silicon compound represented by the general formula (7):

$$U—R^9—SiR^3_{3-b}Z_b \qquad (7)$$

wherein $R^3(s)$, the number of which is (3-b), is/are (each) the same as in the general formula (2), b is any one of 1, 2 and 3, $R^9$ is a bivalent organic group, more preferably a bivalent hydrocarbon group having 1 to 20 carbon atoms, Z(s), the number of which is b, is/are (each) a hydroxyl group or a hydrolyzable group, and U is a group which has at least one active hydrogen atom and is selected from the group consisting of a hydroxyl group, a carboxyl group, a mercapto group, and a (primary or secondary) amino group, the method being disclosed in, for example, JP-B-46-12154 (U.S. Pat. No. 3,632,557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), Japanese Translation of a PCT Application No. 2003-508561 (U.S. Pat. No. 6,197,912), JP-A-6-211879 (U.S. Pat. No. 5,364,955), JP-A-10-53637 (U.S. Pat. No. 5,756,751), JP-A-11-100427, JP-A-2000-169544, JP-A-2000-169545, JP-A-2002-212415, Japanese Patent No. 3313360, U.S. Pat. No. 4,067,844, U.S. Pat. No. 3,711,445, or JP-A-2001-323040.

Given is another method of causing a group which has active hydrogen present at a terminal of a polymer to react with an isocyanate group of an isocyanate compound having a reactive silicon group represented by the general formula (8):

$$O=C=N—R^9—SiR^3_{3-b}Z_b \qquad (8)$$

wherein $R^9$, $R^3(s)$, the number of which is (3-b), Z(s), the number of which is b, and b have the same meanings as in the general formula (7), the method being disclosed in, for example, JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, JP-A-2002-155145, JP-A-2002-249538, WO03/018658 or WO03/059981.

A polymer having a group having at its terminal active hydrogen is not particularly limited, and examples thereof include an oxyalkylene polymer having at its terminal a hydroxyl group (polyetherpolyol), polyacrylpolyol, polyesterpolyol, a saturated hydrocarbon polymer having at its terminal a hydroxyl group (polyolefinpolyol), polythiol compounds, and polyamide compounds.

Organic polymers having, at the main chain skeleton thereof, polyetherpolyol, polyacrylpolyol and polyolefinpolyol components, among the above-mentioned polymers, are preferred since the glass transition temperature is relatively low, and the cured product obtained therefrom is excellent in cold resistance. The curable composition using an organic polymer having at its main chain skeleton a polyetherpolyol component is particularly preferred since the composition is low in viscosity and good in workability and the depth curability and the adhesiveness of the cured product obtained therefrom are good. The curable composition using an organic polymer composed of a polyacrylpolyol component and a saturated hydrocarbon component is more preferred since the weather resistance and the heat resistance of the cured product obtained therefrom is good.

The polyetherpolyol is preferably a compound having at its terminal a hydroxyl group in a number of at least 0.7 on average per molecule thereof.

A production method thereof is not particularly limited, and includes a known method. Examples thereof include polymerization using an alkali metal catalyst, and a method of polymerizing an alkylene oxide using a polyhydroxy compound having in a single molecule thereof at least two hydroxyl groups as an initiator in the presence of a double metal cyanide complex or cesium.

Of these polymerization methods, the polymerization using a double metal cyanide complex is more preferred since a polymer having a low unsaturation degree, a narrow molecular weight distribution (Mw/Mn), and low viscosity is yielded and the acidity resistance and the weather resistance of the cured product obtained therefrom are excellent.

The polyacrylpolyol is a polyol having, as a skeleton, an alkyl(meth)acrylate (co) copolymer and having, in the molecule thereof, a hydroxyl group.

A production method thereof is preferably living radical polymerization, and more preferably atom transfer radical polymerization since the molecular weight distribution of the resultant polymer is narrow and the viscosity thereof can be made low. The production method is also preferably polymerization based on the so-called SGO process disclosed in JP-A-2001-207157, wherein an alkyl acrylate based compound is continuously subjected to bulk-polymerization at a high temperature and high pressure. Examples of the polyacrylpolyol include ARUFON UH-2000 manufactured by Toagosei Co., Ltd.

A polyisocyanate compound is not particularly limited, and examples thereof include aromatic polyisocyanates, such as toluene(tolylene)diisocyanate, diphenylmethane diisocyanate, and xylylene diisocyanate; and aliphatic polyisocyanates, such as isophorone diisocyanate, and hexamethylene diisocyanate.

A silicon compound represented by the general formula (7) is not particularly limited, and examples thereof include silane compounds each having an amino group, such as -aminopropyltrimethoxysilane, N-(-aminoethyl)-aminopropyltrimethoxysilane, -(N-phenyl)aminopropyltrimethoxysilane, N-ethylaminoisobutyltrimethoxysilane, N-cyclohexylaminomethyltrimethoxysilane, N-cyclohexylaminomethyldiethoxymethylsilane, and N-phenylaminomethyltrimethoxysilane; silane compounds each having a hydroxyl group, such as -hydroxypropyltrimethoxysilane; and silane compounds each having a mercapto group, such as -mercaptopropyltrimethoxysilane. Other examples of the silicon compound represented by the general formula (7) include various Michael addition reactants each made from an, -unsaturated carbonyl compound and a silane compound having a primary amino group, and various Michael addition reactants each made from a silane compound having a (meth)acryloyl group and a compound having a primary amino group, the reactants being disclosed in JP-A-6-211879 (U.S. Pat. No. 5,364,955), JP-A-10-53637 (U.S. Pat. No. 5,756,751), JP-A-10-204144 (EP 0831108), JP-A-2000-169544, and JP-A-2000-169545.

An isocyanate compound represented by the general formula (8), which has a reactive silicon group, is not particularly limited, and examples thereof include -trimethoxysilylpropyl isocyanate, -triethoxysilylpropyl isocyanate, -methyldimethoxysilylpropyl isocyanate, -methyldiethoxysilylpropyl isocyanate, trimethoxysilylmethyl isocyanate, triethoxymethylsilylmethyl isocyanate, dimethoxymethylsilylmethyl isocyanate, and diethoxymethylsilylmethyl isocyanate.

The isocyanate compound represented by the general formula (8), which has a reactive silicon group, also include a reaction product disclosed in JP-A-2000-119365 (U.S. Pat. No. 6,046,270), which is made from a silicon compound represented by the general formula (7) and an excessive amount of a polyisocyanate compound.

When amide segments are present in a large amount in the main chain skeleton of the polymer (A), the viscosity of the curing composition may become high, and the viscosity increases when the composition is stored, and as a result, the workability may be declined in some cases. For these reasons, in order to yield a curable composition excellent in storage stability and workability, it is preferred that amide segments are not substantially present in the main chain skeleton. On the other hand, when amide segments are present in the main chain skeleton of the polymer (A), the curability of the curable composition tends to be improved.

Accordingly, in order to yield a curable composition wherein storage stability or workability is consistent with curability, the amount of the amide segment present in the main chain skeleton of the polymer (A) is preferably from 1 to 10, more preferably from 1.5 to 5, and in particular preferably from 2 to 3 on average per molecule of the polymer (A).

If the amount of the amide segment present per molecule of the polymer (A) is less than one, the curability of the curable composition may be insufficient in some cases. If the amount is more than 10, the viscosity of the curable composition may become high so that the workability may be deteriorated in some cases.

A curable composition using a polymer wherein $R^9$ is $-CH_2-$, out of polymers including the compound represented by the general formula (7) or (8), tends to obtain, in particular, excellent curability.

The reactive silicon group represented by the general formula (2) may also be a reactive silicon group represented by the general formula (2-1):

$$-(SiR^{10}{}_{2-c}Y_cO)_l-SiR^3{}_{3-b}Y_b \qquad (2\text{-}1)$$

wherein $R^3$(s) and $R^{10}$(s) each independently represent a substituted or unsubstituted hydrocarbon group having 1 to 20 carbon atoms, and Y(s) (each independently) represent(s) a siloxy group represented by $R^2{}_3SiO$—wherein $R^2$s are each independently a substituted or unsubstituted hydrocarbon group having 1 to 20 carbon atoms, a hydroxyl group, an alkoxy group, an alkenyloxy group, an acyloxy group, or a phenoxy group; b is any one of 1, 2 and 3; c is any one of 0, 1 and 2; and 1 is 0 or an integer of 1 to 19.

The hydrolyzable group represented by (each of) Y(s) in the general formula (2) and the general formula (2-1) is not particularly limited, and includes a known hydrolyzable group. Examples thereof include such as hydrogen and halogen atoms; and alkoxy, acyloxy, ketoxymate, amino, amide, acid amide, aminooxy, mercapto and alkenyloxy groups, and a siloxy group represented by $R^2{}_3SiO$—wherein $R^2$s are each independently a hydrocarbon group having 1 to 20 carbon atoms. Of these examples, preferred are a hydrogen atom, and alkoxy, acyloxy, ketoxymate, amino, amide, aminooxy, mercapto and alkenyloxy groups. The alkoxy groups are more preferred since the groups are mild in hydrolyzability to be easily handled. Of the alkoxy groups, ethoxy and methoxy groups are particularly preferred, and a methoxy group is most preferred.

The hydrolyzable group(s) and/or hydroxyl group(s) may be bonded in a number of 1 to 3 per silicon atom. In a polymer having the reactive silicon group represented by the general formula (2-1), the number of (b+c), which is the total number of the hydrolyzable and/or hydroxyl group(s) contained in a single molecule thereof, is preferably in a range from 1 to 5. When the hydrolyzable group(s) and/or hydroxyl group(s) are bonded in a number of two or more to the silicon atom in the reactive silicon group, they may be the same or different.

$R^3$ (s) described in the general formula (2), and the $R^3$(s) and $R^{10}$ (s) described in the general formula (2-1) are each not particularly limited, and examples thereof include alkyl groups such as methyl and ethyl groups, cycloalkyl groups such as a cyclohexyl group, aryl groups such as a phenyl group, and aralkyl groups such as a benzyl group. Of these groups, a methyl group is preferred.

The reactive silicon group represented by the general formula (2) is not particularly limited, and examples thereof include trimethoxysilyl, triethoxysily, triisopropoxysilyl, dimethoxymethylsilyl, diethoxymethylsilyl, diisopropoxymethylsilyl, methoxydimethylsilyl, and ethoxydimethylsilyl groups. Of these groups, trimethoxysilyl, triethoxysilyl, and dimethoxymethylsilyl groups are preferred since they are high in activity to give good curability. The trimethoxysilyl group is more preferred.

The dimethoxymethylsilyl group is particularly preferred since the curable composition can obtain good curability and storage stability. On the other hand, the triethoxysilyl group is particularly preferred from the viewpoint of a matter that the alcohol produced by hydrolysis reaction of the reactive silicon group is ethanol, which is high in safety.

A method for introducing a reactive silicon group is not particularly limited, and includes a known method. Examples thereof include the following methods (A) to (C):

A method (A) of causing a polymer having in the molecule thereof a functional group such as a hydroxyl group to react with an organic compound having an unsaturated group and an active group reactive with the functional group to yield a polymer having an unsaturated group, or copolymerizing it with an epoxy compound having an unsaturated group to yield a polymer having an unsaturated group; and next causing a hydrosilane having a reactive silicon group to act on the resultant reaction product for hydrosilylation of the reaction product.

A method (B) of causing an organic polymer having an unsaturated group, the polymer being yielded in the same manner as in the method (A), to react with a compound having a mercapto group and a reactive silicon group.

A method (C) of causing an organic polymer having in the molecule thereof a functional group, such as a hydroxyl, epoxy or isocyanate group, to react with a compound having a functional group reactive with the functional group, and a reactive silicon group.

Of these methods, preferred is the method (A), or one of the methods (C) of causing a polymer having at its terminal a hydroxyl group to react with a compound having an isocyanate group and a reactive silicon group since a high conversion rate can be obtained in a relatively short reaction time. The curable composition made mainly of the organic polymer obtained by the method (A), which has one or more reactive silicon groups, tends to have lower viscosity than the curable composition made mainly of the organic polymer obtained by any one of the methods (C), and as a result to obtain good workability. Furthermore, the organic polymer obtained by the method (B) has a stronger offensive odor based on mercaptosilane than the organic polymer obtained by the method (A). For these reasons, the method (A) is more preferred.

The hydrosilane compound used in the method (A) is not particularly limited, and examples thereof include halogenated hydrosilanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, phenyldimethoxysilane, and 1-[2-(trimethoxysilyl)ethyl]-1,1,3,3-tetramethyldisiloxane; acyloxyhydrosilanes such as methyldiacetoxysilane, and phenyldiacetoxysilane; and ketoxymate hydrosilanes such as bis(dimethylketoxymate) methylsilane, and bis(cyclohexylketoxymate)methylsilane. Of these compounds, halogenated hydrosilanes and alkoxyhydrosilanes are preferred. The alkoxyhydrosilanes are more preferred since the curable composition made mainly of the resultant polymer (A) is mild in hydrolyzability to be easily handled. Of the alkoxyhydrosilanes, methyldimethoxysilane is preferred since the silane is easily available, and the curable composition and the cured product each made mainly of the resultant polymer (A) are excellent in various properties (such as curability, storage stability, elongation property, and tensile strength).

Of the above-mentioned hydrosilane compounds, preferred is a hydrosilane compound represented by the general formula (9):

$$H\text{—}SiY_3 \qquad (9)$$

wherein Ys are each the same as in the general formula (2) since the curable composition made mainly of the polymer (A) obtained therefrom by addition reaction has excellent curability. Of hydrosilane compounds each represented by the general formula (9), more preferred are trialkoxysilanes such as trimethoxysilane, triethoxysilane, and triisopropoxysilane.

Regarding a trialkoxysilane having an alkoxy group having one carbon atom (methoxy group), such as trimethoxysilane, out of the above-mentioned trialkoxysilanes, a disproportionate reaction thereof may rapidly advance in some cases. When the disproportionate reaction advances, a compound having very high reactivity, such as dimethoxysilane, may be generated in some cases.

Thus, considering safety in handling, it is preferred to use trialkoxysilane having an alkoxy group having 2 or more carbon atoms and represented by the general formula (10):

$$H\text{—}Si(OR^{11})_3 \qquad (10)$$

wherein three $R^{11}$s are each independently an organic group having 2 to 20 carbon atoms. Triethoxysilane is more preferred since the silane is easily available and is high in safety when handled.

The synthesis method (B) is not particularly limited, and includes, for example, a method of introducing a compound having a mercapto group and a reactive silicon group into unsaturated bond moieties of an organic polymer by radical addition reaction in the presence of a radical initiator and/or a radical generator. The compound having a mercapto group and a reactive silicon group is not particularly limited, and examples thereof include such as -mercaptopropyltrimethoxysilane, -mercaptopropylmethyldimethoxysilane, -mercaptopropyltriethoxysilane, -mercaptopropylmethyldiethoxysilane, mercaptomethyltrimethoxyislane, and mercaptomethyltriethoxysilane.

Of the synthesis methods (C), a method of causing a polymer having at its terminal a hydroxyl group to react with a compound having an isocyanate group and a reactive silicon group is not particularly limited, and includes, for example, a method disclosed in JP-A-3-47825. The compound having an isocyanate group and a reactive silicon group is not particularly limited, and examples thereof include such as -isocyanate propyltrimethoxysilane, -isocyanate propylmethyldimethoxysilane, -isocyanate propyltriethoxysilane, -isocyanate propylmethyldiethoxysilane, isocyanate methyltrimethoxysilane, isocyanate methyltriethoxysilane, isocyanate methyldimethoxymethylsilane, and isocyanate methyldiethoxymethylsilane.

Regarding a silane compound having three hydrolyzable groups bonded to a single silicon atom, such as timethoxysilane, a disproportionate reaction thereof may advance rapidly in some cases. When the disproportionate reaction advances, a dangerous compound such as dimethoxysilane may be generated in some cases.

However, regarding -mercaptopropyltrimethoxysilane or -isocyanate propyltrimethoxysilane, such a disproportionate reaction does not advance. Therefore, in the case of using, as a silicon group, a group having three hydrolyzable groups bonded to a single silicon atom, such as a trimethoxysilyl group, it is preferred to use any one of the synthesis methods (B) and (C).

On the other hand, regarding a silane compound represented by the general formula (11), a disproportionate reaction does not advance:

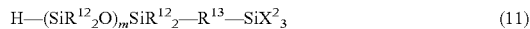

$$H-(SiR^{12}{}_2O)_m SiR^{12}{}_2-R^{13}-SiX^2{}_3 \quad (11)$$

wherein three $X^2$s are each independently a hydroxyl group or a hydrolyzable group; $R^{12}$s, the number of which is (2m+2), are each independently a hydrocarbon group, and is preferably a hydrocarbon group having 1 to 20 carbon atoms, more preferably a hydrocarbon group having 1 to 8 carbon atoms, in particular preferably a hydrocarbon group having 1 to 4 from the viewpoint of availability and costs; $R^{13}$ is a bivalent organic group, and is preferably a bivalent organic group having 1 to 12 carbon atoms, more preferably a bivalent organic group having 2 to 8 carbon atoms, in particular preferably a bivalent organic group having 2 carbon atoms from the viewpoint of availability and costs; m is an integer of 0 to 19, and is preferably 1 from the viewpoint of availability and costs. Therefore, in the case of introducing a group having three hydrolyzable groups bonded to a single silicon atom in the synthesis method (A), it is preferred to use the silane compound represented by the general formula (11).

Examples of the silane compound represented by the general formula (11) include such as 1-[2-(trimethoxysilyl)ethyl]-1,1,3,3-tetramethyldisiloxane, 1-[2-(trimethoxysilyl)propyl]-1,1,3,3-tetramethyldisiloxane, and 1-[2-(trimethoxysilyl)hexyl]-1,1,3,3-tetramethyldisiloxane.

The polymer (A) having one or more reactive silicon groups may be any polymer having in the molecule thereof a linear or branched structure. The number-average molecular weight thereof, which is a value measured by GPC in terms of polystyrene, is preferably from 500 to 100,000, more preferably from 1,000 to 50,000, in particular preferably from 3,000 to 30,000. If the number-average molecular weight is less than 500, the resultant cured product tends to be poor in elongation property. If the molecular weight is more than 100,000, the curable composition becomes high in viscosity and tends to be poor in workability.

The number of the reactive silicon group(s) contained in the polymer (A) is preferably 1 or more, more preferably from 1.1 to 5 on average per molecule thereof. If the number of the reactive silicon group(s) contained in the molecule is less than one on average, the curable composition tends to be poor in curability and the cured product obtained therefrom tends not to express good rubbery behavior.

The reactive silicon group may be present at one or more terminals of its main chain or at one or more terminals of its side chain(s), or at terminals of the main chain and the side chain(s). In particular, when the reactive silicon group(s) are present only at the terminal(s) of the main chain, the effective network length of the polymer component contained in the resultant cured product becomes long. Thus, the cured product easily becomes a rubber cured product high in strength and elongation and low in elastic modulus.

The curable composition of the present invention contains, as an essential component, a Lewis acid and/or derivative thereof (B).

The Lewis acid and/or derivative thereof (B) is/are used together with an amine compound (C), which will be described later, and take (s) in charge of acting as a curing catalyst for the polymer (A) having one or more reaction silicon group. The Lewis acid and/or derivative thereof (B) is/are not particularly limited, and include(s) conventionally known compound(s). Examples thereof include halogenated metal compounds such as $AlCl_2$, $TiCl_4$, $ZrCl_4$, $SnCl_4$, $FeCl_3$, $ZnCl_2$, and $SbCl_5$, or derivatives thereof; halogenated borons such as $BF_3$, $BCl_3$, and $BBr_3$, or derivatives thereof; metal triflates, such as scandium triflate, yttrium triflate, indium triflate, tin triflate, and zinc triflate; and other compounds such as trimethylsilyl trifluoromethansulfonate, and tris(pentafluorophenyl)borane.

The derivatives of halogenated metal compounds are not particularly limited, and examples thereof include such as a compound wherein a halogen atom or halogen atoms in a halogenated metal compound are wholly or partially substituted with oxygen or one or more alkoxide or carboxyl groups, and a compound wherein halogen atoms in a halogenated metal compound are partially substituted with one or more alkyl groups.

The derivatives of halogenated borons are not particularly limited, and examples thereof include such as a dimethyl ether complex of $BF_3$, a diethyl ether complex of $BF_3$, a tetrahydrofuran complex of $BF_3$, a methanol complex of $BF_3$, an acetic acid complex of $BF_3$, a phenol complex of $BF_3$, a piperidine complex of $BF_3$, a monoethylamine complex of $BF_3$, an isopropylamine complex of $BF_3$, a benzylamine complex of $BF_3$, and ANCHOR 1040 and ANCHOR 1115 commercially available from Air Products and Chemicals, Inc.

Of the above-mentioned Lewis acids and/or derivatives (B) thereof, $BF_3$ and derivatives thereof are preferred since they are good in reactivity. The diethyl ether complex of $BF_3$ is more preferred.

Since the curable composition tends to exhibit good storage stability and other advantages, preferred are the dimethyl ether complex of $BF_3$, the diethyl ether complex of $BF_3$, the tetrahydrofuran complex of $BF_3$, the methanol complex of $BF_3$, the acetic acid complex of $BF_3$, and the phenol complex of $BF_3$. More preferred are the dimethyl ether complex of $BF_3$, the diethyl ether complex of $BF_3$, and the tetrahydrofuran complex of $BF_3$.

The piperidine complex of $BF_3$, the monoethylamine complex of $BF_3$, the isopropylamine complex of $BF_3$, the benzylamine complex of $BF_3$, and ANCHOR 1040 and ANCHOR 1115 and other amine complexes commercially available from Air Products and Chemicals, Inc. are preferred since these are easily handled and have other advantages.

Regarding the Lewis acid and/or derivative thereof (B), a single kind thereof may be incorporated into the curable composition, or plural kinds thereof may be incorporated in combination.

The amount of the Lewis acid and/or derivative thereof (B) to be incorporated is not particularly limited, and is preferably from 0.01 to 10 parts by weight, more preferably from 0.1 to 5 parts by weight, in particular preferably from 0.5 to 2 parts by weight based on 100 parts by weight of the polymer (A). If the amount to be incorporated is more than 10 parts by weight, the storage stability of the curable composition tends to be deteriorated and the component (B), which is relatively expensive, is used in a large amount so that the costs increase to tend to give an economical disadvantage. If the amount to be incorporated is less than 0.01 parts by weight, the curing rate of the curable composition tends to become low.

The Lewis acid and/or derivative thereof (B) may be used alone; however, the component(s) may also be used in a state where the component (s) is/are diluted with a solvent or the like. In the use of, for example, a Lewis acid high in reactivity, such as a diethyl ether complex of $BF_3$, or a derivative thereof, it is effective to use a diluting agent since fuming is restrained, the handleability is improved, a rapid and violent reaction does not advance when the acid or derivative is incorporated, the evenness of the curable composition can be secured, and other advantages are produced.

The curable composition of the present invention contains, as an essential component, an amine compound (C). The amine compound (C) is used together with the Lewis acid and/or derivative thereof (B), and takes in charge of acting as a curing catalyst for the polymer (A) having one or more reactive silicon groups. The amine compound (C) also includes a nitrogen-containing cyclic compound such as pyridine.

The amine compound (C) is not particularly limited, and examples thereof include aliphatic primary amines, such as methylamine, ethylamine, propylamine, isopropylamine, butylamine, amylamine, hexylamine, octylamine, 2-ethylhexylamine, nonylamine, decylamine, laurylamine, pentadecylamine, cetylamine, stearylamine, and cyclohexylamine; aliphatic secondary amines, such as dimethylamine, diethylamine, dipropylamine, diisopropylamine, dibutylamine, diamylamine, dihexylamine, dioctylamine, di(2-ethylhexyl)amine, didecylamine, dilaurylamine, dicetylamine, distearylamine, methylstearylamine, ethylstearylamine, and butylstearylamine; aliphatic tertiary amines, such as triamylamine, trihexylamine, and trioctylamine; aliphatic unsaturated amines, such as triallylamine, and oleylamine; aromatic amines, such as aniline, laurylaniline, stearylamine, and triphenylamine; heterocyclic compounds, such as pyridine, 2-aminopyridine, 2-(dimethylamino)pyridine, 4-(dimethylamino)pyridine, 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,2-dimethyl-1,4,5,6-tetrahydropyrimidine, 1,8-diazabicyclo[5,4,0]undecene-7 (DBU), 6-(dibutylamino)-1,8-diazabicyclo[5,4,0]undecene-7 (DBA-DBU), 1,5-diazabicyclo[4,3,0]nonene-5 (DBN), 1,4-diazabicyclo[2,2,2]octane (DABCO), and aziridine; and other amines, such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-dibutylaminopropylamine, 3-morpholinopropylamine, 2-(1-piperdinyl)ethylamine, xylylenediamine, and 2,4,6-tris(dimethylaminomethyl)phenol; guanidins, such as guanidine, phenylguanidine, and diphenylguanidine; and biguanides, such as butylbiguanide, 1-o-tolylbiguanide, and 1-phenylbiguanide.

Of these amine compounds (C), preferred are amidines, such as 1,2-dimethyl-1,4,5,6-tetrahydropyrimidine, DBU, DBA-DBU, and DBN; guanidines, such as guanidine, phenylguanidine, and diphenylguanidine; and biguanides, such as butylbiguanide, 1-o-tolylbiguanide, and 1-phenylbiguanide, since these exhibit a high activity.

Preferred are also aryl-substituted guanidines or aryl-substituted biguanides such as phenylguanidine, 1-o-tolylbiguanide, and 1-phenylbiguanide since at the time when these are each incorporated into the curable composition, the curability of the surface tends to be good, the resultant cured product tends to exhibit good adhesiveness, and other advantages are produced.

Amine compounds exhibit basicity. Amine compounds the conjugate acid of which has a pKa value of 11 or more are preferred since the catalytic activity thereof is high. Of the amine compounds, DBU or DBN is more preferred since the conjugate acid of the amine compound has a pKa value of 12 or more so that the amine compound exhibits a high catalytic activity.

In the present invention, the amine compound (C) may also be a silane coupling agent having an amino group (hereinafter referred to as aminosilane). The aminosilane is a compound having a hydrolyzable silicon group and a substituted or unsubstituted amino group.

Examples of the substituent in the substituted amino group include such as alkyl, aralkyl and aryl groups. The hydrolyzable silica group includes a group wherein Y is a hydrolyzable group out of groups represented by the general formula (2). Examples of the hydrolyzable group include the groups given above as the examples thereof. Of these groups, methoxy and ethoxy groups are preferred since the groups are mild in hydrolyzability and easy to be handled.

The number of the hydrolyzable group(s) bonded to the silicon atom in the aminosilane is preferably 2 or more, in particular preferably 3 or more.

The aminosilane is not particularly limited, and examples thereof include such as -aminopropyltrimethoxysilane, -aminopropyltriethoxysilane, -aminopropyltriisopropoxysilane, -aminopropylmethyldimethoxysilane, -aminopropylmethyldiethoxysilane, -(2-aminoethyl)aminopropyltrimethoxysilane, -(2-aminoethyl)aminopropylmethyldimethoxysilane, -(2-aminoethyl)aminopropyltriethoxysilane, -(2-aminoethyl)aminopropylmethyldiethoxysilaen, -(2-aminoethyl)aminopropyltriisopropoxysilane, -(2-(2-aminoethyl)aminoethyl)aminopropyltrimethoxysilane, -(6-aminohexyl)aminopropyltrimethoxysilane, 3-(N-ethylamino)-2-methylpropyltrimethoxysilane, -ureidopropyltrimethoxysilane, -ureidopropyltriethoxysilane, N-phenyl- -aminopropyltrimethoxysilane, N-benzyl- -aminopropyltrimethoxysilane, N-vinylbenzyl- -aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane, and N,N'-bis[3-(trimethoxysilyl)propyl]ethylenediamine.

Of these aminosilanes, aminosilanes having an amino group (—$NH_2$) are preferred since these are good in curability. Preferred are -aminopropyltrimethoxysilane, -aminopropyltriethoxysilane, -aminopropylmethyldimethoxysilane, and -(2-aminoethyl)aminopropyltrimethoxysilane since these are easily available.

Ketimines, which are each hydrolyzed to produce the amine compound as described above, may also be used as the amine compound (C).

When the amine compound (C) is incorporated into the curable composition, only a single kind thereof may be incorporated or two or more kinds may be incorporated in combination.

The amount of the amine compound (C) to be incorporated is not particularly limited, and is preferably from 0.001 to 20 parts by weight, more preferably from 0.1 to 10 parts by weight based on 100 parts by weight of the polymer (A). If the amount of the amine compound (C) to be incorporated is less than 0.001 parts by weight, the curing rate of the curable composition tends to be small and the catalytic activity tends to fall while the composition is stored. On the other hand, if the amount of the amine compound (C) to be incorporated is more than 20 parts by weight, the curing period becomes too short so that the workability tends to be deteriorated.

The piperidine complex of $BF_3$, the monoethylamine complex of $BF_3$, the isopropylamine complex of $BF_3$ and the benzylamine complex of $BF_3$, ANCHOR 1040 and ANCHOR 1115 commercially available from Air Products and Chemicals, Inc., and the like, which have been given in the description of the Lewis acid and/or derivative thereof (B), may each be used as a substance containing both of the Lewis acid and/or derivative thereof (B), and the amine compound (C) of the present invention.

The curable composition of the present invention contains, as an essential component, a compound (D) having a reactive silicon group.

The compound (D) having a reactive silicon group is a compound having a silicon group represented by the general formula (1):

$$-SiR^1{}_{3-a}X_a \qquad (1)$$

wherein $R^1$ (s) (each independently) represent(s) a substituted or unsubstituted hydrocarbon group having 1 to 20 carbon atoms; Y(s) (each independently) represent(s) at least one selected from the group consisting of a hydroxyl group, an alkoxy group, an alkenyloxy group, an acyloxy group, a phenol group, or a siloxy group represented by $R^2{}_3SiO$— wherein $R^2$s are each independently a substituted or unsubstituted hydrocarbon group having 1 to 20 carbon atoms; and a is any one of 1, 2 and 3. The compound (D) is a compound which can react with the Lewis acid and/or derivative thereof (B) to become a curing catalyst.

In the general formula (1), examples of X (s) are the same as the compounds given as the specific examples and the preferred examples of Y (s) in the general formula (2). Examples of $R^1$(s) in the general formula (1) are the same as the compounds given as the specific examples and the preferred examples of $R^3$(s) in the general formula (2).

In the general formula (1), a is preferably 2 or 3, more preferably 3 since the raw material is easily available.

The reactive silicon group represented by the general formula (1) is not particularly limited, and examples thereof include trimethoxysilyl, triethoxysilyl, methyldimethoxysilyl, methyldiethoxysilyl, vinyldimethoxysilyl, vinyldiethoxysilyl, phenyldimethoxysilyl, and phenyldiethoxysilyl groups.

The compound (D) having a reactive silicon group is not particularly limited as far as the compound is a tetravalent silane compound. The compound (D) may include any of a single molecular compound, or a high molecular compound. More specific examples thereof include tetramethoxysilane, tetraethoxysilane, methyltrimethoxysilane, methyltriethoxysilane, vinyltrimethoxysilane, vinyltriethoxysilane, phenyltrimethoxysilane, phenyltriethoxysilane, dimethyldimethoxysilane, dimethyldiethoxysilane, diphenyldimethoxysilane, diphenyldiethoxysilane, trimethylmethoxysilane, trimethylethoxysilane, triphenylmethoxysilane, triphenylethoxysilane, or the like. The compound (D) also includes a silicon compound that may be used as a silane coupling agent or silicate, which will be described later. The compound (D) also includes a high molecular compound such as polysiloxane having at its terminal a siloxy, hydroxyl, alkoxy, alkenyloxy acyloxy or phenoxy group.

The compound (D) having a reactive silicon group may include a self-condensed product wherein a silicon compound is partially condensed, or a partially bonded product composed of the compound and a silicon compound which has a reactive silicon group different from the compound (D) having a reactive silicon group.

The compound (D) having a reactive silicon group is preferably a compound which is low in volatility and is in a liquid form at normal temperature and normal pressure since the compound is easily handled, the safety is high and other advantages are produced. The molecular weight thereof is preferably 3,000 or less. If the molecular weight is more than 3,000, the amount to be added necessary for producing a sufficient effect as a curing agent increases to tend to give an economical disadvantage.

The amount of X(s) present in the compound (D) having a reactive silicon group and described in the general formula (1) is preferably 5 mmol/g or more, more preferably 10 mmol/g or more, even more preferably 14 mmol/g or more, in particular preferably 20 mmol/g or more. If the amount of X(s) present in the compound (D) having a reactive silicon group is low, the curability of the resultant cured product is difficult to be high and in order to make the curing rate of the curable composition high, the compound (D) having a reactive silicon group is required in a large amount. Thus, the compatibility of the component (D) in the composition is deteriorated, or mechanical properties of the resultant cured product are easily declined, and the cost also easily becomes high.

Regarding the compound (D) having a reactive silicon group, only a single kind thereof may be incorporated into the curable composition, or plural kinds thereof may be incorporated in combination.

The amount of the compound (D) having a reactive silicon group to be incorporated is preferably from 0.5 to 20 parts by weight, more preferably from 1 to 10 parts by weight based on 100 parts by weight of the polymer (A). In a case where particularly excellent curability is required for the curable composition, the amount is preferably from 3 to 10 parts by weight, in particular preferably from 5 to 10 parts by weight. If the amount of the compound (D) having a reactive silicon group to be incorporated is less than 0.5 parts by weight, the curing rate tends to become small, and further the catalytic activity tends to be declined after the composition is stored. On the other hand, if the amount of the compound (D) having a reactive silicon group to be incorporated is more than 20 parts by weight, working life becomes too short so that the workability tends to be deteriorated. Thus, physical properties of the resultant cured product tend to fall. Furthermore, an economical disadvantage tends to be produced.

The curable composition of the present invention contains, as an essential component, filler (E).

The filler (E) takes in charge of heightening the strength of the cured product obtained by curing the curable composition, adjusting the viscosity or the thixotropy of the curable composition to improve the handleability, decrease costs per weight or volume based on an increase in the amount thereof, modifying color or surface property to give a design property, and attaining others.

The filler (E) is not particularly limited, and examples thereof include reinforcing fillers such as fumed silica, precipitated silica, crystalline silica, fused silica, dolomite, silicic anhydride, hydrated silicic acid, and carbon black; ground calcium carbonate, colloidal calcium carbonate, magnesium carbonate, diatomaceous earth, calcined clay, clay, talc, titanium oxide, bentonite, organic benotnite, ferric oxide, fine aluminum powder, flint powder, zinc oxide, activated zinc white, Shirasu balloons, glass microballoons, organic microballoons made of phenol resins or vinylidene chloride resin, and organic powders such as PVC powder and PMMA powder; and fibrous fillers such as asbestos, glass fibers and filaments.

The amount of the filler (E) to be incorporated is preferably from 1 to 250 parts by weight, more preferably from 10 to 200 parts by weight based on 100 parts by weight of the polymer (A).

When the curable composition is used for a one-part-type adhesive, a sealant or the like, it is preferred for the purpose of obtaining good storage stability to mix the filler with a dehydrating agent such as calcium oxide uniformly, put the mixture into a bag made of an airtight material, allow the bag to stand still for an appropriate time, thereby dehydrating and drying the filler beforehand, and then incorporate the filler, as disclosed in JP-A-2001-181532 or the like.

When the resultant cured product is used for an article for which transparency is required, the filler (E) to be incorporated is preferably polymeric powder disclosed in JP-A-11-302527 or the like, which is made of a polymer such as methyl methacrylate, amorphous silica, or the like. The filler (E) is more preferably hydrophobic silica or the like disclosed in JP-A-2000-38560 or the like.

Hydrophobic silica is a material obtained by making the surface of fine silicon dioxide powder, which is generally occupied by silanol groups (—SiOH), into —SiO-hydrophobic groups by treating the surface with an organic silicon halide compound, alcohols or the like. The hydrophobic silica is not particularly limited, and includes, for example, a material obtained by treating silanol groups present in the surface of fine silicon dioxide powder with dimethylsiloxane, hexamethyldisilazane, dimethyldichlorosilane, trimethoxyoctylsilane, trimethylsilane or the like. Untreated fine silicon dioxide powder, the surface of which is occupied by silanol groups (—SiOH), is called hydrophilic fine silica powder.

When the resultant cured product is used for an article for which high strength is required, the filler (E) to be incorporated is preferably a silicon compound such as fumed silica, precipitated silica, crystalline silica, fused silica, dolomite, silicic anhydride, or hydrated silicic acid; carbon black, surface-treated fine calcium carbonate, calcined clay, clay, activated zinc white or the like. The amount of the filler (E) to be incorporated is preferably from 1 to 200 parts by weight based on 100 parts by weight of the polymer (A).

When the resultant cured product is used for a low-strength article for which a high elongation rate is required, the filler (E) to be incorporated is preferably titanium oxide, calcium carbonate such as ground calcium carbonate, magnesium carbonate, talc, ferric oxide, zinc oxide, Shirasu balloons, or the like. The amount of the filler (E) to be incorporated is preferably from 5 to 200 parts by weight based on 100 parts by weight of the polymer (A).

In the case of the incorporation of calcium carbonate, with an increase in the specific surface area, a tendency that the strength at break, the fracture elongation and the adhesiveness of the cured product are enhanced becomes higher. Regarding the filler, only a single kind thereof may be incorporated, or plural kinds thereof may be incorporated in combination.

Examples wherein plural kinds of the filler (E) are incorporated in combination are not particularly limited. Various combinations can be given. Of the combinations, preferred is a combination wherein surface-treated fine calcium carbonate is used together with calcium carbonate having a large particle diameter, such as ground calcium carbonate, since various physical properties of the resultant cured product are excellent.

The surface-treated fine calcium carbonate is preferably particulate calcium carbonate having a particle diameter of 0.5 μm or less and having a particle surface treated with an aliphatic acid or an aliphatic acid salt.

The calcium carbonate having a large particle diameter is preferably particulate calcium carbonate having a particle diameter of 1 μm or more and having an untreated particle surface.

When the workability (such as anti-sagging) of the composition or making the surface of the resultant cured product mat is required, the filler (E) to be added is preferably an organic balloon or inorganic balloon. These filler may be subjected to surface treatment. Only one species thereof may be used, or two or more species thereof may be used in a mixture form. To improve the workability (such as anti-sagging), the particle diameter of the balloons is preferably 0.1 mm or less. To make the cured product surface mat, the diameter is preferably from 5 to 300 μm.

The curable composition of the present invention is preferably used as a sealant for siding boards made of a ceramic or the like, for joints of outer walls of houses, or for outer wall tiles, an adhesive, or the like.

When the curable composition is used for such an application, the resultant cured product is present on outer faces, such as joint portions; thus, it is desired to match a design of outer walls with a design of the cured product. In particular, in recent years, outer walls giving a high-grade impression, such as sputtering-coated walls, and walls to which a colored aggregate or the like is added, have been used; thus, importance of the design of the cured product has been increasing.

In order to obtain a design giving a high-grade impression, a scaly or granular filler (E) is added to the curable composition of the present invention. Here, the addition of a granular filler (E) gives a sandy particle surface in a sand-scattered tone or in a sandstone tone, or the addition of a scaly filler (E) gives an irregular surface resulting from the scaly form. The resultant cured product matches with outer walls giving a high-grade impression, and is further excellent in chemical resistance. Thus, the cured product has a characteristic that its appearance giving a high-grade impression is kept for a long term.

The scaly or granular filler (E) is not particularly limited to, and include, for example, a substance disclosed in JP-A-09-53063. The diameter thereof, which is appropriately selected in accordance with a material, a pattern or the like of the outer walls, is preferably 0.1 mm or more, more preferably from 0.1 to 5.0 mm. In the case of the scaly filler (E), the thickness is preferably 1/10 to 1/5 of the diameter (0.01 to 1.0 mm).

The addition amount of the scaly or granular filler (E) is appropriately selected in accordance with the size of the scaly or granular filler (E), and the material, the pattern or the like of the outer walls, and is preferably from 1 to 200 parts by weight based on 100 parts by weight of the curable composition.

A material of the scaly or granular filler (E) is not particularly limited to, and examples thereof include natural materials such as silica sand and mica, synthetic rubber, synthetic resin, and inorganic materials such as alumina. They may be appropriately colored in accordance with the material, the pattern or the like of the outer walls in order that when they are filled into the joints or the like, the design is made better.

A preferred finishing method therefor, and the like are disclosed in JP-A-09-53063 and the like.

The scaly or granular substance may be incorporated into the curable composition in advance, or the substance may be incorporated into the curable composition when it is used.

For a similar purpose, balloons (preferably, those having an average particle diameter of 0.1 mm or more) may also be added to a curable composition. The resultant cured product can have a sandy surface in a sand-scattered tone or in a sandstone tone and can be made light. The balloon is filler in the form of a sphere having a hollow inside.

The balloons are not particularly limited to, and include, for example, substances disclosed in JP-A-10-251618, JP-A-02-129262, JP-A-04-8788, JP-A-04-173867, JP-A-05-1225, JP-A-07-113073, JP-A-09-53063, JP-A-2000-154368, JP-A-2001-164237, WO 97/05201 and the like.

Examples of the materials of the balloons include inorganic materials such as glass, volcanic soil, silica and the like; and organic materials such as phenol resin, urea resin, polystyrene, saran, composite materials made of an inorganic material and an organic material; and laminated materials composed of a plurality of layers are included. They may be used alone, or may be added in combination of a plurality of kinds.

Additionally, the balloons may be those having coated surfaces, and those treated with various surface-treating agents. Specific examples thereof include a product wherein organic balloons are coated with calcium carbonate, talc, titanium oxide or the like, and a product wherein inorganic balloons are subjected to surface-treatment with an adhesion imparting agent.

The particle diameter of the balloons is preferably 0.1 mm or more, more preferably from 0.2 to 5.0 mm, and particularly preferably from 0.5 to 5.0 mm. If the particle diameter is less than 0.1 mm, only the viscosity of the composition increases but the resultant cured product may not exibit a sandy impression even if the balloons are added in a large amount.

The addition amount of the balloons may be appropriately selected in accordance with a design of interest. The balloons which have a particle diameter of 0.1 mm or more are added to the curable composition so as to give preferably a volume concentration of 5 to 25% by volume, and more preferably a volume concentration of 8 to 22% by volume. If the volume concentration of the balloons is less than 5% by volume, the sandy impression tends to be lost. If it is more than 25% by volume, the viscosity of the curable composition becomes high so that the workability tends to deteriorate. Additionally, the modulus of the resultant cured product also becomes high so that basic performances for a sealant or an adhesive tend to be damaged.

When the balloons are added, a slip inhibitor as disclosed in JP-A-2000-154368; an amine compound for giving irregularities to the surface of the resultant cured product to make the surface mat, as disclosed in JP-A-2001-164237; or the like can be added in combination. The amine compound is preferably a primary amine and/or a secondary amine which has/have a melting point of 35 C or higher.

The balloons may also be thermally-expansive hollow fine particles as disclosed in JP-A-2004-51701, JP-A-2004-66749, or the like. The thermally-expansive hollow fine particles are plastic spheres wherein a low boiling point compound, such as a hydrocarbon having 1 to 5 carbon atoms, is encapsulated into a spherical form with a polymeric shell material (vinylidene chloride based copolymer, acrylonitrile based copolymer, or vinylidene chloride-acrylonitrile copolymer). When the thermally-expansive hollow fine particles are added to the curable composition of the present invention, an adhesive composition, which can be peeled from an adherend without breaking the adherend only by heating the composition when the composition becomes unnecessary and which can be further peeled by heating using no organic solvent, can be obtained. This is based on a mechanism that when portions of the adhesive are heated, a gas pressure inside the shells of the thermally-expansive hollow fine particles increases so that the polymeric shell material softens, thereby expanding dramatically to cause the adhesive surfaces to be peeled from each other.

When the curable composition of the present invention contains sealant cured particles, irregularities are formed on the surface of the resultant cured product, as well, and as a result, the design of the product can be made better. Preferred diameter, blend amount, material and the like of the sealant cured particles are disclosed in JP-A-2001-115142. The diameter is preferably from 0.1 to 1 mm, and more preferably from 0.2 to 0.5 mm. The blend amount is preferably from 5 to 100 parts by weight, and more preferably from 20 to 50 parts by weight based on 100 parts by weight of the curable composition.

The material is not particularly limited to as far as the material is used as a sealant. Examples thereof include such as an urethane resin, silicone, modified silicone, and polysulfide rubber. Among them, preferred are modified silicone based sealant cured particles.

One of the objects of the present invention is to restrain the following matter when the Lewis acid and/or derivative thereof (B) is used together with the filler (E): a matter that the activity of the Lewis acid and/or derivative thereof (B) is suppressed by effect of the filler (E). Such an advantageous effect of the present invention is remarkably exerted when calcium carbonate is used as the filler (E), more remarkably exerted when precipitated calcium carbonate is used, and in particular remarkably exerted when precipitated calcium carbonate surface-treated with an aliphatic acid or an aliphatic acid salt is used.

The curable composition of the present invention contains, as its essential components, the polymer (A) having one or more reactive silicon groups, the Lewis acid and/or derivative thereof (B), the amine compound (C), the compound (D) having a reactive silicon group, and the filler (E). However, it is not necessarily essential that these essential components are each present as a single substance in the curable composition. The essential components may be present as a reactant generated by mixing two or more of the components with each other or with some other material. In the present invention, the meaning of each of the essential components also includes a compound originating from the essential component.

If necessary, a silane coupling agent may be added, as an adhesion imparting agent, to the curable composition of the present invention.

The silane coupling agent referred to herein is a compound having, in the molecule thereof, a hydrolyzable silicon group and a functional group other than the silicon group. The agent exhibits a remarkable adhesiveness improving effect under a non-primer condition or primer-treatment condition when the agent is applied between a variety of adherends, that is, inorganic substrates/such as glass, aluminum, stainless steel, zinc, copper, mortar and the like; and organic substrates such as vinyl chloride, acrylic resin, polyester, polyethylene, polypropylene, polycarbonate and the like; and a cured product.

When the silane coupling agent is used under a non-primer condition, the effect of improving the adhesiveness of a cured product onto the various adherends is particularly remarkable. Besides, the silane coupling agent is a compound which can function as a physical property adjustor, an agent for improving the dispersibility of inorganic filler, or some other agents. In the present invention, the silane coupling agent may exhibit a function as the compound (D) having a reactive silicon group.

An example of the hydrolyzable silicon group of the silane coupling agent is a group wherein Z is a hydrolyzable group out of the groups represented by the general formula (2). Specific examples thereof include the groups which are already exemplified in the embodiment of the polymer (A). Among them, methoxy and ethoxy groups are preferred since the hydrolysis thereof is mild and they are easy handled. The silane coupling agent preferably has two or more hydrolyzable groups bonded to a silicon atom, and in particular preferably has three or more hydrolyzable groups.

Examples of the functional group other than the hydrolyzable silicon group include, but are not particularly limited to, substituted or unsubstituted amino, mercapto, epoxy, carboxyl, vinyl, and isocyanate groups, isocyanurate, halogens and others. Among them, substituted or unsubstituted amino, epoxy and isocyanate groups, and isocyanurate are preferred since they have a high adhesiveness improving effect of a cured product to be obtained. The amino groups are particularly preferred.

As already described in the embodiment of the amine compound (C), a silane coupling agent having both a hydrolyzable silicon group and an amino group is generally referred to an aminosilane. In the present invention, the silane coupling agent also has a function as a curing catalyst. In adding an aminosilane to a curable composition, when the aminosilane is desired to exhibit a function as an adhesion imparting agent more intensely, it is preferred to add the aminosilane in an amount more than that required as a curing catalyst.

Specific examples of the silane coupling agent other than aminosilanes include, but are not particularly limited to, isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl)trimethoxysilane, (isocyanatemethyl)dimethoxymethylsilane and the like; ketimine type silanes such as N-(1,3-dimethylbutylidene)-3-(triethoxysilyl)-1-propanamine and the like; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; epoxysilanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, β-(3,4-epoxycyclohexyl)ethyltriethoxysilane and the like; carboxysialnes such as β-carboxyethyltriethoxysilane, β-carboxyethylphenylbis(2-methoxyethoxy)silane, N-β-(carboxymethyl)aminoethyl-γ-aminopropyltrimethoxysilane and the like; vinyl-type-unsaturated-group-containing silanes such as vinyltrimethoxysilane, vinyltriethoxysilane, γ-methacryloyloxypropylmethyldimethoxysilane, γ-acryloyloxypropyltriethoxysilane and the like; halogen-containing silanes such as γ-chloropropyltrimethoxysilane and the like; and isocyanurate silanes such as tris(3-trimethoxysilylpropyl)isocyanurate and the like, and the like.

Further, examples of the silane coupling agent include reactants of the aminosilanes and an epoxysilane, reactants of an aminosilane and an isocyanatesilane, and reactants of an aminosilane and a silane having a (meth)acryloyloxy group; condensed products wherein the above silanes are partially condensed; and derivatives obtained by modifying these materials, such as amino-modified silylpolymers, silylated aminopolymers, unsaturated aminosilane complexes, phenylamino long-chain alkylsilanes, aminosilylated silicones, and silylated polyesters; and the like.

The silane coupling agents may be used alone or in the form of a mixture of two or more thereof.

When the silane coupling agent is added, the addition amount thereof is preferably from about 0.01 to 20 parts by weight, more preferably from about 0.1 to 10 parts by weight, and particularly preferably from about 1 to 7 parts by weight based on 100 parts by weight of the polymer (A). If the addition amount is less than 0.1 parts by weight, the adhesiveness of the resultant cured product tends not to be sufficiently gained. On the other hand, if the amount is more than 20 parts by weight, the curable composition tends not to gain a practical curing speed and further the curing reaction tends not to be easily sufficiently proceeded.

An adhesion imparting agent other than the silane coupling agent mentioned above can be added to the composition of the present invention if necessary. As the adhesion imparting agent other than the silane coupling agent, which is not particularly limited to, the following can be used besides the above-mentioned silane coupling agent: for example, an epoxy resin, a phenol resin, sulfur, an alkyl titanate, an aromatic polyisocyanate and others. The adhesion imparting agent may be used alone or in the form of a mixture of two or more thereof.

In the present invention, a different curing catalyst can be added, if necessary, when the advantageous effects of the present invention are not lowered.

Specific examples include carboxylic acids such as acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and other acids; derivatives of the carboxylic acids (carboxylic anhydrides, esters, amides, nitriles and acyl chlorides); metal carboxylates such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, cerium carboxylate and other carboxylates; titanium compounds such as tetrabutyl titanate, tetrapropyl titanate, titanium tetrakis(acetylacetonate), bis(acetylacetonate)diisopropoxytitanium, diisopropoxytitanium bis(ethylacetonate) and other titanates; organictin compounds such as dibutyltin dilaurate, dibutyltin maleate, dibutyltin phthalate, dibutyltin dioctanoate, dibutyltin bis(2-ethylhexanoate), dibutyltin bis (methylmaleate), dibutyltin bis(ethylmaleate), dibutyltin bis (butylmaleate), dibutyltin bis(octylmaleate), dibutyltin bis (tridecylmaleate), dibutyltin bis(benzylmaleate), dibutyltin diacetate, dioctyltin bis(ethylmaleate), dioctyltin bis(octylmaleate), dibutyltin dimethoxide, dibutyltin bis(nonylphenoxide), dibutenyltin oxide, dibutyltin oxide, dibutyltin bis (acetylacetonate), dibutyltin bis(ethylacetoacetonate), a reactant of dibutyltin oxide and a silicate compound, and a reactant of dibutyltin oxide and a phthalic acid ester and other tin compounds; aluminum compounds such as aluminum tris(acetylacetonate), aluminum tris(ethylacetoacetate), and diisopropoxyaluminum methylacetoacetate and other aluminum compounds; zirconium compounds such as zirconium tetrakis(acetylacetonate) and the like; various metal alkoxides such as tetrabutoxyhafnium and the like; organic acidic phosphates; organic sulfonic acids such as trifluoromethanesulfonic acid and the like; and inorganic acids such as hydrochloric acid, phosphoric acid, boronic acid and other acids;

Lewis acids such as halogenated metal compounds including aluminum chloride, titanium chloride, zirconium chloride, zinc chloride, zinc bromide, iron chloride, copper chloride, antimony chloride, tin chloride and the like; triflates including metal triflates such as indium triflate, tin triflate, trialkylsilyltriflate and the like; and the derivatives thereof.

When any one of these curing catalysts is used together, the catalyst activity becomes high and an improvement of resultant cured products is expected in depth curability, thin-layer curability, adhesiveness, and others. However, if the amount of the added carboxylic acid is large, a sufficient adhesiveness of resultant cured products may not be obtained.

As the addition amount of the organictin compound increases, there is a case that the recovery property, the durability and the creep resistance of the resultant cured product deteriorate or the toxicity thereof increases. Therefore, when the organictin compound is added, the addition amount thereof is preferably 5 parts or less by weight, more preferably 0.5 parts or less by weight, even more preferably 0.05 parts or less by weight, and particularly preferably no containing based on 100 parts by weight of the polymer (A).

A silicate may be optionally added to the curable composition of the present invention. The silicate is a substance which acts, as a crosslinking agent, onto the polymer (A), and has a function of improving the recovery property, the durability and the creep resistance of the resultant cured product.

Moreover, the addition of the silicate causes an improvement of the adhesiveness, the waterproof adhesiveness and the adhesion durability under high temperature and high humidity of the resultant cured product. In the present invention, the silicate may exhibit a function as the compound (D) having a reactive silicon group.

A silicate is not particularly limited to, but includes tetraalcoxysilane or partially hydrolyzed condensation products thereof. Specific examples of the silicate include tetraalkoxysilanes(tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane and the like; and partially hydrolyzed condensation products thereof.

In the case of using the silicate, the use amount thereof is preferably from 0.1 to 20 parts by weight, more preferably from 0.5 to 10 parts by weight for 100 parts by weight of the polymer (A).

The partially hydrolyzed condensate of tetraalkoxysilane is not particularly limited to, and includes, for example, a product obtained by adding water to tetraalkoxysilane, hydrolyzing the silane partially, and condensing the resultant.

The addition of the partially hydrolyzed condensate of tetraalkoxysilane is preferred since the recovery property, the durability and the creep resistance of the resultant cured product are improved larger than those of the curable composition to which tetraalkoxysilane is added.

As the partially hydrolyzed condensate of tetraalkoxysilane, for example, METHYL SILICATE 51 and ETHYL SILICATE 40 (each of which is manufactured by Colcoat Co., Ltd.) are commercially available. They may each be used as an additive.

In order to prevent a change on the surface curability of the curable composition by the storage, it is preferred to select, as a silicate, a compound wherein a hydrolyzable group bonded to a silicon atom is equivalent to the hydrolyzable group in the reactive silicon group present in the polymer (A). In other words, when the polymer (A) has a methoxysilyl group, it is preferred to select a silicate having a methoxysilyl group; and when the polymer (A) has an ethoxysilyl group, it is preferred to select a silicate having an ethoxysilyl group.

A plasticizer can be added to the composition of the present invention if necessary. The addition of the plasticizer makes it possible to adjust the viscosity and the slump property of the curable composition, and the tensile strength, the elongation and other mechanical properties of the cured product obtained by curing the composition.

Examples of the plasticizer include, but are not particularly limited to, phthalic acid esters such as dibutyl phthalate, diheptyl phthalate, bis(2-ethylhexyl)phthalate, butylbenzyl phthalate and the like; non-aromatic dibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

It is preferred to add a polymeric plasticizer, which contains a polymeric component in its molecule, for the reasons that the initial property of the resultant cured product can be maintained over a long term; when alkyd paint is applied to the resultant cured product, the dryability (also referred to the paintability) can be improved; and the like.

Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, dipropylene glycol or the like; polyethers, for example, polyetherpolyols such as polyethylene glycol, polypropylene glycol polytetraethylene glycol or the like, which has a molecular weight of 500 or more, preferably 1,000 or more, and derivatives obtained by changing hydroxyl groups of these polyetherpolyols to ester groups, ether groups, or the like, and the like; polystyrenes such as polystyrene, and poly-α-methylstyrene, and the like; and polybutadiene, polybutene, polyisobutylene, butadieneacrylonitrile, and polychloroprene and the like. However, the polymeric plasticizer is not limited thereto.

Of these polymeric plasticizers, preferred are plasticizers high in compatibility with the polymer (A). Examples thereof include e polyethers and vinyl based polymers.

Polyethers are more preferred since the surface curability and the depth curability of the curable composition is good and no curing delay is caused after the composition is stored. Specifically, polypropylene glycol is particularly preferred.

Furthermore, vinyl based polymers are preferred since the polymers are high in compatibility with the polymer (A) and the weather resistance and the heat resistance of the resultant cured product are good. Among the polymers, more preferred are acrylic based polymers and/or methacrylic based polymers, and particularly preferred are acrylic based polymers such as alkyl polyacrylate esters.

A method for producing alkyl polyacrylate esters is not particularly limited to, and living radical polymerization is preferred since a narrow molecular weight distribution and low viscosity can be gained. Atom transfer radical polymerization is more preferred. Particularly preferred is a method of subjecting an alkyl polyacrylate ester based compound to continuous bulk polymerization under high temperature and high pressure, the method being referred to the SGO process and disclosed in JP-A-2001-207157 and the like.

The number-average molecular weight of the polymeric plasticizer is preferably from 500 to 15,000, from 800 to 10,000, more preferably from 1,000 to 8,000, even more preferably from 1,000 to 5,000. The molecular weight is most preferably from 1,000 to 3,000. If the molecular weight of the polymeric plasticizer is too low, the plasticizer flows out from the resultant cured product with time by heat or rainfall so that the initial physical properties cannot be maintained over a long term, the plasticizer causes pollution based on adhesion of dust thereto, and the alkyd paintability tends to be inferior. If the molecular weight is too high, the viscosity of the curable composition becomes high so that the workability deteriorates.

The molecular weight distribution of the polymeric plasticizer is not particularly limited, and a narrow distribution is preferred. The distribution is preferably less than 1.80, 1.70 or less, more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may or may not have a reactive silicon group in its molecule. In the case of adding the polymeric plasticizer which has a reactive silicon group, the polymeric plasticizer is taken in the curing reaction so that the plasticizer can be prevented from being bleeded from the resultant cured product, and thus, the case is preferred.

The polymeric plasticizer which has a reactive silicon group is preferably a compound having a reactive silicon group in a number of one or less on average per molecule of the compound, and is more preferably a compound having a reactive silicon group in a number of 0.8 or less. In the case of adding the plasticizer which has a reactive silicon group, in particular, an oxyalkylene polymer having a reactive silicon group, the number-average molecular weight thereof is preferably lower than that of the polymer (A) in order to gain a sufficient plasticizing effect.

About the plasticizer, only one kind may be added, or a plurality of kinds may be added in combination. In addition, a low molecular weight plasticizer and a polymeric plasticizer may be used added in combination. These plasticizers may be blended when the polymer (A) is produced.

In the addition of the plasticizer, the addition amount thereof is preferably from 5 to 150 parts by weight, more preferably from 10 to 120 parts by weight, and particularly preferably from 20 to 100 parts by weight based on 100 parts by weight of the polymer (A). If the addition amount is less than 5 parts by weight, the effect of the plasticizer tends not to be expressed. If the amount is more than 150 parts by weight, the mechanical strength of the cured product tends to be insufficient.

A tackifier may be added to the composition of the present invention if necessary. The adhesion imparting agent of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as C5 hydrocarbon resin, C9 hydrocarbon resin, C5C9 hydrocarbon copolymer resin and the like), hydrogenated petroleum resins, terpene resin, and DCPD resin petroleum resin and the like. These may be used alone or in combination of two or more thereof.

Examples of the styrene block copolymer and the hydrogenated product thereof include, but are not particularly limited to, styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like.

When the tackifier is added, the addition amount thereof is preferably from 5 to 1,000 parts by weight, and more preferably from 10 to 100 parts by weight based on 100 parts by weight of the polymer (A).

A solvent or a diluting agent may be optionally added into the curable composition of the present invention. The solvent and the diluting agent are not particularly limited to, and examples thereof include such as aliphatic hydrocarbons, aromatic hydrocarbons, alicyclic hydrocarbons, halogenated hydrocarbons, alcohols, esters, ketones, ethers and the like. They may be added alone or may be added in combination of a plurality of kinds.

In the case of adding the solvent or the diluting agent, the boiling point of the solvent or the diluting agent is preferably 150 C or higher, and more preferably 200 C or higher in order to prevent volatile components from diffusing into the air when the curable composition is used indoors.

A physical property adjuster may be optionally added into the curable composition of the present invention. The physical property adjuster is an agent having a function of adjusting the tensile property and the hardness of the resultant cured product.

The physical property adjustor is not particularly limited, and examples thereof include alkylalkoxysilanes such as methyltrimethoxysilane, dimethyldimethoxysilane, trimethylmethoxysilane, n-propyltrimethoxysilane and the like; alkylisopropenoxysilanes such as dimethyldiisopropenoxysilane, methyltriisopropenoxysilane, γ-glycidoxypropylmethyldiisopropenoxysilane and the like; alkoxysilanes having a functional group, such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropylmethyldimethoxysilane and the like; silicone vanish; polysiloxanes and the like. These may be used alone or in combination of two or more thereof.

Among the physical property adjusters, preferred are those which are hydrolyzed to produce a compound having a monovalent silanol group in its molecule, since the adjusters have an effect of lowering the modulus of the resultant cured product without deteriorating the tack of the surface thereof. Among these compounds, more preferred are compounds which are hydrolyzed to produce trimethylsilanol.

The compounds which are hydrolyzed to produce a compound having a monovalent silanol group in its molecule are not particularly limited to. Examples thereof include compounds disclosed in JP-A-05-117521; compounds that are derivatives of an alkylalcohol such as hexanol, octanol, decanol and the like, and are hydrolyzed to produce an organic silicon compound represented by $R_3SiOH$ such as trimethylsilanol and the like; and compounds that are derivatives of a polyhydric alcohol having 3 or more hydroxyl groups in its molecule, such as trimethylolpropane, glycerin, pentaerythritol, sorbitol and the like, and are hydrolyzed to produce an organic silicon compound represented by $R_3SiOH$ such as trimethylsilanol and the like, the compounds being disclosed in JP-A-11-241029, or the like.

Furthermore, examples thereof include compounds that are derivatives of an oxypropylene polymer and are hydrolyzed to produce an organic silicon compound represented by $R_3SiOH$ such as trimethylsilanol and the like, the compounds being disclosed in JP-A-07-258534; and compounds having a group having hydrolyzable silicon that can be crosslinked and a silicon group capable of being hydrolyzed to produce a compound having a monovalent silanol group, the compound being disclosed in JP-A-06-279693.

When the physical property adjuster is added, the addition amount thereof is preferably from 0.1 to 20 parts by weight, and more preferably from 0.5 to 10 parts by weight based on 100 parts by weight of the polymer (A).

A thixotropic agent (anti-sagging agent) may be optionally added into the curable composition of the present invention. The thixotropic agent is an agent having a function of preventing the curable composition from sagging to make the workability good.

The thixotropic agent is not particularly limited to, and examples thereof include such as polyamide waxes; hydrogenated castor oil derivatives; and metal soaps, such as calcium stearate, aluminum stearate, barium stearate and the like. Furthermore, examples thereof include a rubber powder, having a particle diameter of 10 to 500 μm, disclosed in JP-A-11-349916 and others; and organic fibers disclosed in JP-A-2003-155389 and the like. These thixotropic agents (anti-sagging agents) may be added alone or in combination of a plurality of kinds.

When the thixotropic agent is added, the addition amount thereof is preferably from 0.1 to 20 parts by weight based on 100 parts by weight of the polymer (A).

A compound having an epoxy group in its molecule may be optionally added into the curable composition of the present invention. The addition of the compound having an epoxy group makes it possible to heighten the recovery property of the resultant cured product.

The compound having an epoxy group is not particularly limited to, and examples thereof include compounds such as epoxidized unsaturated oils and fats; epoxidized unsaturated aliphatic acid esters; alicyclic epoxy compounds; epichlorohydrin derivatives and the like; and mixtures thereof and the like. More specific examples thereof include such as epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among these compounds, E-PS is preferred.

When the epoxy compound is added, the addition amount thereof is preferably from 0.5 to 50 parts by weight based on 100 parts by weight of the polymer (A).

An optically curable material may be optionally added into the curable composition of the present invention. The optically curable material is a material which receives an effect of light to cause a chemical change in its molecular structure in short time, thereby generating a physical change, such as curing. When the optically curable material is added into the curable composition, a coating of the optically curable material is formed on the surface of the resultant cured product so that the tack or the weather resistance of the cured product is improved.

The optically curable material is not particularly limited to, and includes a known optically curable material, such as an organic monomer, an oligomer, a resin, a composition containing thereof and the like. Examples thereof include such as unsaturated acrylic based compounds, polyvinyl cinnamates, azido resins and the like.

Examples of the unsaturated acrylic based compounds include monomers and oligomers having one or a plurality of acrylic based or methacrylic based unsaturated groups in its molecule; and mixtures thereof. Specific examples thereof include a monomer such as propylene (or butylene or ethylene), glycol di(meth)acrylate and neopentyl glycol di(meth)acrylate, and oligo esters having a molecular weight of 10,000 or less. More specific examples thereof include ARONIX M-210, ARONIX M-215, ARONIX M-220, ARONIX M-233, ARONIX M-240, and ARONIX M-245, which are special (bifunctional) acrylates; (trifunctional) ARONIX M-305, ARONIX M-309, ARONIX M-310, ARONIX M-315, ARONIX M-320, and ARONIX M-325; and (polyfunctional) ARONIX M-400 (ARONIXs are each manufactured by Toagosei Co., Ltd.)m and the like. Among these examples, preferred are compounds having an acrylic functional group, and more preferred are compounds having 3 or more acrylic functional groups on average in its molecule.

The polyvinyl cinnamate is a photosensitive resin having a cinnamoyl group as a photosensitive group, and examples thereof include a compound wherein polyvinyl alcohol is esterified with cinnamic acid; and a great number of other polyvinyl cinnamate derivatives.

The azido resins are known as photosensitive resins having an azide group as a photosensitive group. An ordinary example thereof is a resin obtained by adding a diazide compound as a photosensitizer to a rubber photosensitive liquid. Besides, the azido resins are exemplified in detail in "Photosensitive Resin (published in Mar. 17, 1972, published by Insatsu Gakkai Shuppanbu Ltd., p. 93 and pages subsequent thereto, p. 106 and pages subsequent thereto, and p. 117 and pages subsequent thereto)". They may be used alone or in a mixture form, or may be used together with a sensitizer, if necessary.

When a sensitizer, such as ketones, a nitro compound and the like, or a promoter such as amines and the like, is added, there may be a case where the effect may be increased.

When the optically curable material is added, the addition amount thereof is preferably from 0.1 to 20 parts by weight, and more preferably from 0.5 to 10 parts by weight based on 100 parts by weight of the polymer (A). If the amount is 0.1 parts or less by weight, the effect of heightening the weather resistance of the resultant cured product is hardly produced. If the amount is 20 parts or more by weight, the resultant cured product becomes too hard so that the product tends to be cracked.

An oxygen curable material may be added into the curable composition of the present invention if necessary. The oxygen curable material is a material which reacts with oxygen in the air so as to be cured. By the addition of the oxygen curable material, a cured coating is formed in the vicinity of the surface of the resultant cured product so that the tack of the cured product surface or adhesion of dirt or dust thereto can be prevented.

The oxygen curable material is not particularly limited to as far as it is a compound having an unsaturated compound reactive with oxygen in the air. Examples thereof include drying oils such as tung oil, linseed oil and the like, various alkyd resins obtained by modifying the compounds; acrylic based polymers, epoxy based resins, and silicone based resins modified with a drying oil; liquid polymers such as polymers of 1,2-polybutadiene, 1,4-polybutadiene, C5-C8 dienes and the like, which are obtained by polymerizing or copolymerizing diene based compounds, such as butadiene, chloroprene, isoprene, 1,3-pentadiene and the like; liquid copolymers such as NBR, SBR and the like, which are obtained by copolymerizing diene based compounds with a vinyl based compound that is copolymerizable, such as acrylonitrile, styrene and the like, so as to render the diene based compound a main component; and further various modified products thereof (such as maleinate-modified products, boiled oil modified products and the like) and the like. Of these examples, tung oil and liquid diene based polymers are preferred. As for the oxygen curable material, one kind thereof may be added, or a plurality of kinds may be added in combination.

About the oxygen curable material, there may be a case where the effect may be increased by mixing with or adding to a catalyst for promoting the curing reaction, or a metallic drier. The catalyst for promoting the curing reaction or the metallic drier is not particularly limited to, and examples thereof include metal salts such as cobalt naphthenate, lead naphthenate, zirconium naphthenate, cobalt octanoate, zirconium octanoate and the like, amine compounds and the like.

When the oxygen curable material is added, the addition amount thereof is preferably from 0.1 to 20 parts by weight, and more preferably from 0.5 to 10 parts by weight based on 100 parts by weight of the polymer (A). If the addition amount is less than 0.1 parts by weight, the effect that the stain resistance of the resultant cured product is improved tends to become insufficient. If the amount is more than 20 parts by weight, the tensile property and the like of the resultant cured product tend to be damaged.

It is preferred that the oxygen curable material is mixed with or is added to an optically curable material, as disclosed in JP-A-03-160053.

An antioxidant may be optionally added into the curable composition of the present invention. The addition of the antioxidant makes it possible to improve the heat resistance of the resultant cured product.

The antioxidant is not particularly limited to, and examples thereof include hindered phenol based, monophenol based, bisphenol based, and polyphenol based antioxidants. Of these antioxidants, preferred are hindered phenol based antioxidants. Preferred are also hindered amine based light stabilizers, such as TINUVIN 622LD, TINUVIN 144, CHIMASSORB 944LD, and CHIMASSORB 119FL (each of which is manufactured by Ciba Specialty Chemicals Inc.); ADEKASTAB LA-57, ADEKASTAB LA-62, ADEKASTAB LA-67, ADEKASTAB LA-63, and ADEKASTAB LA-68 (each of which is manufactured by ADEKA Corporation); SANOL LS-770, SANOL LS-765, SANOL LS-292, SANOL LS-2626, SANOL LS-1114, and SANOL LS-744 (each of which is manufactured by Sankyo LifeTech Co., Ltd.), and the like. Specific examples of the antioxidant are also disclosed in JP-A-04-283259 and JP-A-09-194731.

When the antioxidant is added, the addition amount thereof is preferably from 0.1 to 10 parts by weight, and more preferably from 0.2 to 5 parts by weight based on 100 parts by weight of the polymer (A).

A light stabilizer may be optionally added into the curable composition of the present invention. The addition of the light stabilizer makes it possible to prevent the resultant cured product from being deteriorated due to photo oxidization.

The light stabilizer is not particularly limited to, and examples thereof include benzotriazole based compounds, hindered amine based compounds, benzoate based compounds and the like. Among these compounds, preferred are hindered amine based compounds.

When the light stabilizer is added, the addition amount thereof is preferably from 0.1 to 10 parts by weight, and more preferably from 0.2 to 5 parts by weight based on 100 parts by weight of the polymer (A). Specific examples thereof are also disclosed in JP-A-09-194731.

When an optically curable material such as an unsaturated acrylic based compound is added into the curable composition of the present invention, it is preferred to add a hindered amine based light stabilizer having a tertiary amine group, as disclosed in JP-A-05-70531, since the storage stability of the curable composition is improved.

The hindered amine based light stabilizer having a tertiary amine group is not particularly limited to, and examples thereof include TINUVIN 622LD, TINUVIN 144, and CHIMASSORB 119FL (each of which is manufactured by Ciba Specialty Chemicals Inc.); ADEKASTAB LA-57, ADEKASTAB LA-62, ADEKASTAB LA-67, and ADEKASTAB LA-63 (each of which is manufactured by ADEKA Corporation); SANOLs LS-765, LS-292, LS-2626, LS-1114, and LS-744 (each of which is manufactured by Sankyo LifeTech Co., Ltd.) and the like.

An ultraviolet absorbent may be optionally added into the curable composition of the present invention. The addition of the ultraviolet absorbent causes an improvement in the surface weather resistance of the resultant cured product.

The ultraviolet absorbent is not particularly limited to, and examples thereof include benzophenone based, benzotriazole based, salicylate based, substituted tolyl based, metal chelate based compounds and the like. Among them, benzotriazole based ultraviolet absorbents are particularly preferred.

When the ultraviolet absorbent is added, the addition amount thereof is preferably from 0.1 to 10 parts by weight, and more preferably from 0.2 to 5 parts by weight based on 100 parts by weight of the polymer (A).

It is preferred to add the antioxidant, the light stabilizer, and the ultraviolet absorbent in combination into the curable composition. It is preferred that, for example, a phenol based or hindered phenol based antioxidant, a hindered amine based light stabilizer, and a benzotriazole based ultraviolet absorbent are mixed to add.

An epoxy resin may be optionally added into the curable composition of the present invention. According to the addition of the epoxy resin, the adhesiveness of the resultant cured product is improved. The curable composition into which the epoxy resin is added is used preferably as an adhesive, in particular, an adhesive for outer wall tiles.

The epoxy resin is not particularly limited to, and examples thereof include epichlorohydrin-bisphenol A type epoxy resins, epichlorohydrin-bisphenol F type epoxy resins, flame retardant epoxy resins such as glycidyl ether of tetrabromobisphenol A, Novolak type epoxy resins, hydrogenated bisphenol A type epoxy resins, glycidyl ether type epoxy resins of an adduct of bisphenol A propylene oxide, p-oxybenzoic acid glycidyl ether ester type epoxy resins, m-aminophenol epoxy resins, diaminodiphenylmethane based epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ether, glycidyl ether of a polyhydric alcohol such as glycerin, hydantoin type epoxy resins, epoxidized products of an unsaturated polymer such as petroleum resins, and the like. Among these examples, preferred are epoxy resins having at least two or more epoxy groups in its molecule, and more preferred are bisphenol A type epoxy resins and Novolak type epoxy resins and the like, since they make the reactivity of the curable composition high, the resultant cured product easily forms a three-dimensional network structure, and the like.

The addition amount of the epoxy resin is varied in accordance with the use application of the curable composition, and the like. For example, in the case of improving such as the impact resistance, the flexibility, the toughness and the peeling strength and the like of the epoxy resin cured product, the polymer (A) is added preferably in an amount of 1 to 100 parts by weight, and more preferably in an amount of 5 to 100 parts by weight based on 100 parts by weight of the epoxy resin. On the other hand, in the case of improving the strength of the cured product of the polymer (A), the epoxy resin is added preferably in an amount of 1 to 200 parts by weight, and more preferably in an amount of 5 to 100 parts by weight based on 100 parts by weight of the polymer (A).

When the epoxy resin is added into the curable composition of the present invention, it is preferred to add a curing agent for epoxy resin in combination.

The epoxy resin curing agent is not particularly limited as far as the agent has a function to cure the epoxy resin, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol and tripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinic anhydride, pyromellitic anhydride, chlorendic anhydride and the like; alcohols; phenols; carboxylic acids; and diketone complex compounds of aluminum or zirconium, and the like. These may be added alone or in combination of two or more thereof.

When the epoxy resin curing agent is added, the addition amount thereof is preferably from 0.1 to 300 parts by weight based on 100 parts by weight of the epoxy resin.

It is preferred to use, out of the epoxy resin curing agents, a ketimine compound since a one-part-type curable composition can be obtained. The ketimine compound has a nature that the compound exists stably in the absence of water; and the compound is decomposed to a primary amine and a ketone by water, and the resultant primary amine becomes a curing agent for curing an epoxy resin at room temperature. The ketimine compound includes a compound obtained by condensation reaction between an amine compound and a carbonyl compound.

An amine compound and a carbonyl compound to be used for synthesizing the ketimine are not particularly limited to, and a known compound can be exemplified. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phneylenediamine, p,p'-biphenylenediamine and the like; a polyhydric amine such as 1,2,3-triaminopropane, triaminobenzene, tris(2-aminoethyl)amine, tetrakis(aminomethyl)methane and the like; a polyalkylenepolyamine such as diethylenetriamine, triethylenetriamine, tetraethylenepentamine and the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane and the like; and the like.

As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane or the like; or the like.

A ketimine compound having an imino group includes a compound synthesized by reacting an imino group with styrene oxide, a glycidyl ether such as butyl glycidyl ether allyl glycidyl ether or the like, a glycidyl ester, or the like.

These ketimines may be added alone or in combination of two or more thereof.

When a ketimine compound is added, the use amount thereof is preferably from 1 to 100 parts by weight for 100 parts by weight of the epoxy resin, and is varied in accordance with the kind of the epoxy resin and that of the ketimine.

If necessary, a flame retardant may be added to the curable composition of the present invention. A flame retardant is not particularly limited to, and includes a phosphorus-containing plasticizer such as ammonium polyphosphate, tricresyl phosphateor, and the like; aluminum hydroxide, magnesium hydroxide, thermally expandable graphite and the like. These flame retardants may be used alone or in combination of two or more thereof.

When the flame retardant is added, the addition amount thereof is preferably from 5 to 200 parts by weight, and more preferably from 10 to 100 parts by weight based on 100 parts by weight of the polymer (A).

Various additives other than the above agents may be optionally added into the curable composition of the present invention to adjust various physical properties of the curable composition or the resultant cured product. Examples of the additives include such as a curability adjuster, a radical inhibitor, a metal inactivating agent, an antiozonant, phosphorus-based peroxide decomposing agent, a lubricant, a pigment, a foaming agent, a termiticide, an antifungal agent and the like. Specific examples thereof are disclosed in publications such as JP-B-04-69659, JP-B-07-108928, JP-A-63-254149, JP-A-64-22904, JP-A-2001-72854 and the like. These additives may be added alone or in combination of a plurality of kinds.

As a method for preparing the curable composition of the present invention, any one of one-part-type preparation and two-part-type preparation may be adopted. One-part-type preparation is preferred since the workability is good. The one-part-type preparation is a preparation in which all blending components are blended with each other in advance, and then the resultant blend is air-tightly stored, and the blend is cured with moisture in the air after applying to a spot. The two-liquid type preparation is a preparation in which components such as a curing catalyst, filler, a plasticizer, water and the like are blended with each other, as a blending agent for curing, separately and then the blending agent for curing and a polymer composition are mixed with each other before applying to a spot.

In a case where the curable composition is of a one-part-type, all blending components are blended in advance; thus, if water is present in the blend, the curing may proceed during being stored. Accordingly, it is preferred to dehydrate the blending components containing water in advance and subsequently add them to the components, or dehydrate the components by a reduced pressure or the like while the components are blended and kneaded.

In a case where the curable composition is of a two-part-type, it is unnecessary to incorporate a curing catalyst into a main part containing the polymer having a reactive silicon group; thus, even if some amount of water is contained in the blend, it is hardly feared that the curing (gelatinization) proceeds. However, when the blend is required to have storage stability over a long term, it is preferred to dehydrate the blend.

When the blend is in the form of a solid such as a powder, the method for the dehydrating and drying is preferably drying by heating, or pressure-reducing dehydration. When the blend is in the form of a liquid, the method is preferably pressure-reducing dehydration, or dehydration using synthetic zeolite activating alumina, silica gel, caustic lime, magnesium oxide, or the like. Preferred is also dehydration performed by adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane, γ-glycidoxypropyltrimethoxysilane and the like; an oxazolidine compound such as 3-ethyl-2-methyl-2-(3-methylbutyl)-1,3-oxazolidine; or an isocyanate compound into the curable composition so as to cause the compound to react with water contained in the blend. By adding an alkoxysilane compound, an oxazolidine compound and an isocyanate compound in such a way, the storage stability of the curable composition is improved.

When an alkoxysilane compound reactive with water, such as vinyltrimethoxysilane, is used for drying, the addition thereof is preferably from 0.1 to 20 parts by weight, and more preferably from 0.5 to 10 parts by weight based on 100 parts by weight of the polymer (A).

The method for preparing the curable composition of the present invention is not particularly limited to, and a known method may be adopted, examples of which include such as a method of preparing the above blending components, and then kneading the components under room temperature or heating by use of a mixer, a roll, a kneader or the like, or a method of using a small amount of an appropriate solvent to dissolve the blending components, and then mixing the components.

A preferred example of the preparing method includes a preparing method including a step of mixing components containing at least the polymer (A) having one or more reactive silicon groups and/or the compound (D) having a reactive silicon group, and the Lewis acid and/or derivative thereof (B) with each other in advance, and then mixing this mixture with other component(s) containing at least the filler (E).

When this method is adopted, the curable composition can easily be obtained having more excellent curability.

At the time of mixing the components containing at least the polymer (A) having one or more reactive silicon groups and/or the compound (D) having a reactive silicon group, and the Lewis acid and/or derivative thereof (B) with each other in advance, the components may be merely mixed. However, the components may also be heated. In the case of using, in particular, a compound which is not relatively high in reactivity, such as an amine complex of $BF_3$, as the Lewis acid and/or derivative thereof (B), the curing rate of the curable composition can be made high by heating the components. After the mixing, the following treatment(s) may be conducted: neutralization, adsorption, degassing, extraction, distillation, recrystallization, crystallization, and/or some other treatment.

Another preferred example of the preparing method also includes a preparing method including a step of mixing components containing at least the polymer (A) having one or more reactive silicon groups and the filler (E) with each other in advance, and then mixing this mixture with other component (s) containing at least the Lewis acid and/or derivative thereof (B).

When this method is adopted, the addition of the Lewis acid and/or derivative thereof (B), which is/are a catalyst(s), can be attained after the filler (E), which is a incorporating material easily containing water, is beforehand dehydrated. Therefore, the storage stability tends to become good.

An additional preferred example of the preparing method includes a method including a step of heating the prepared curable composition. In a case where the catalyst amount is insufficient or in other cases, sufficient curability may not be obtained even when the components are within the range of the present invention. However, according to the method including the heating step, produced are advantageous effects of obtaining higher curability, and obtaining sufficient curability in a smaller amount of the Lewis acid and/or derivative thereof (B) and/or in a smaller amount of the amine compound (C).

The heating temperature in this case is, for example, 40° C. or higher temperature. When a higher temperature is used, advantageous effects are obtained in a shorter heating time.

The advantageous effects are obtained by applying the heating to the composition obtained after the components containing the polymer (A) having one or more reactive silicon groups and/or the compound (D) having a reactive silicon group, and Lewis acid and/or derivative thereof (B) are mixed with each other. Specifically, it is allowable to use a method of mixing the polymer (A) having one or more reactive silicon groups and/or the compound (D) having a reactive silicon group, and the Lewis acid and/or derivative thereof (B) with each other, subsequently heating the mixture, and also mixing the mixture with the other component(s) after the heating, or a method of mixing all the components with each other in any manner, and then heating the resultant composition.

The curable composition of the present invention is used preferably as a tackifier; a sealant for buildings, ships and boats, automobiles, roads and the like; an adhesive; a mold-making agent; a vibration proof material; a damping material; a soundproof material; a foaming material; a paint; a spraying material; or the like. Among them, the curable composition is used more preferably as a sealant or an adhesive, since the resultant cured product is excellent in flexibility and adhesiveness.

Moreover, the curable composition of the present invention may be used as various applications, for example, an electric/electronic part material, such as a solar cell rear face sealant; an electrically insulating material, such as an insulating coating material for electric wires/cables; an elastic adhesive; a contact-type adhesive; a spray type sealant; a crack repairing material; tiling adhesives; a powdery paint; a casting material; a rubber material for medical use; an adhesive for medical use; a sealant for medical device; a food wrapping material; a jointing sealant for exterior members such as a siding board; a coating material; a primer; an electroconductive material for shielding electromagnetic waves; a thermally conductive material; a hot melt material; an electrical or electronic potting material; a film; a gasket; various molding materials; a rust-preventive or waterproofing sealant for end faces (cut regions) of net-reinforced glass or laminated glass; and a liquid sealing agent used in such as car components, electric components, various mechanical components and the like, and the like.

Furthermore, the curable composition can be adhered closely to wide range of substrates such as glass, ceramics, woods, metals, resin-molded products and the like by itself or by aid of a primer. Accordingly, the curable composition may also be used as air-tightly sealing compositions and adhesive compositions of various types.

The curable composition of the present invention may also be used as an adhesive for interior panels, an adhesive for exterior panels, an adhesive for laying tiles, an adhesive for laying building stones, an adhesive for finishing ceilings, an adhesive for finishing floors, an adhesive for finishing walls, an adhesive for vehicle panels, an adhesive for assembling an electrical, electronic or precision instrument, a sealant for direct grading, a sealant for laminated glass, a sealant for the SSG method, or a sealant for working joints of buildings.

EXAMPLES

The present invention will be specifically described by way of the following examples and comparative examples; however, the present invention is not limited thereto.

Synthesis Example 1

Propylene oxide was polymerized in the presence of a zinc hexacyanocobaltate glyme complex catalyst, using as an initiator a mixture of polyoxypropylenediol having a molecular weight of about 2,000 and polyoxypropylenetriol having a molecular weight of about 3,000, the ratio by weight therebetween being 1/1, to obtain polypropylene oxide having a number-average molecular weight of about 19,000 (the molecular weight, in terms of polystyrene, measured by use of an liquid-sending system, HLC-8120 GPC, manufactured by Tosoh Corporation, a column, TSK-GEL H type, manufactured by Tosoh Corporation, and a solvent, THF).

Subsequently, thereto was added a solution of NaOMe in methanol in an amount of a 1.2-fold equivalent of hydroxyl groups of this hydroxyl-group-terminated polypropylene oxide, and then methanol was distilled off. Furthermore, thereto was added allyl chloride to convert the hydroxyl groups at the terminals to allyl groups. The process gave an allyl-group-terminated polypropylene oxide having a number-average molecular weight of about 19,000.

With 100 parts by weight of the resultant crude allyl-group-terminated polypropylene oxide were mixed 300 parts by weight of n-hexane and 300 parts by weight of water, and then the components was stirred. The components were centrifuged to remove water. With the resultant hexane solution were further mixed 300 parts by weight of water, and the components were stirred. The components were again centrifuged to remove water. Thereafter, hexane was removed by degassing under a reduced pressure to yield a purified allyl-group-terminated polypropylene oxide (hereinafter referred to as allyl polymer).

At 90° C., 100 parts by weight of the allyl polymer obtained were caused to react with 1.35 parts by weight of methyldimethoxysilane in the presence of a 150-ppm amount of a solution of platinum vinylsiloxane complex in isopropanol, the content of platinum therein being 3% by weight, for 5 hours to yield a methyldimethoxysilyl-group-terminated polypropylene oxide (A1). According to a measurement by $^1$H-NMR (measurement in a $CDCl_3$ solvent by means of JNM-LA-400 manufactured by JEOL Ltd.), the number of the methyldimethoxysilyl groups at the terminals was about 1.7 on average per molecule.

Example 1, and Comparative Examples 1 to 3

In accordance with the formulation shown in Table 1, the following were mixed with each other: the polymer (A1) yielded in Synthesis Example 1 as a polymer (A) having one or more reactive silicon groups; filler shown in Table 1 as filler (E); and a plasticizer and a thixotropic agent as other components. The components were kneaded with a three-axis paint roll to prepare a main agent 1.

TABLE 1

| Composition (parts by weight) | | Main agent 1 |
|---|---|---|
| Polymer (A) | Polymer (A1) | 100 |
| Filler (E) | CCR[1] | 120 |
| | TIPAQUE R820[2] | 20 |
| Plasticizer | Actcol P23[3] | 55 |
| Thixotropic agent | DISPARLON 6500[4] | 2 |

[1]Colloidal calcium carbonate surface-treated with an aliphatic acid (manufactured by Shiraishi Kogyo Kaisha, Ltd.)
[2]Titanium oxide (manufactured by Ishihara Sangyo Kaisha, Ltd.)
[3]PPG 3000 (manufactured by Takeda Pharmaceutical Company Limited)
[4]Aliphatic acid amide wax (manufactured by Kusumoto Chemicals, Ltd.)

In accordance with each formulation shown in Table 2, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%. A part of the composition was kneaded with the spatula, and the period until the viscous liquid turned to a rubbery elastomer, which was defined as the gelation period, was measured as the curing period. The results are shown in Table 2.

TABLE 2

| Composition (parts by weight) | | Example 1 | Comparative Examples 1 | Comparative Examples 2 | Comparative Examples 3 |
|---|---|---|---|---|---|
| Main agent ((A) + (E)) | Main agent 1 | [1] 297 | [1] 297 | [1] 297 | [1] 297 |
| Lewis acid derivative (B) | $BF_3$ diethyl ether complex solution[1] | [3] 2 | | [3] 2 | [2] 2 |
| Amine compound (C) | DBU[2] | [4] 2 | [3] 2 | | [3] 2 |
| Compound (D) having a reactive silicon group | Vinyltrimethoxysilane | [2] 10 | [2] 10 | [2] 10 | |
| Curability | Gelation period | 45 minutes | >5 hours | >5 hours | >5 hours |
| Surface state of cured product | | Large tackiness | — | — | — |

Each sequence of [1], [2], [3] and [4] denotes that the corresponding components were mixed in accordance with this sequence.
[1]50% by weight solution in THF
[2]1,8-diazabicyclo[5.4.0]-7-undecene As is understood from Table 2, the composition obtained by mixing the Lewis acid derivative (B), the amine compound (C), and the compound (D) having a reactive silicon group with the composition obtained by mixing the polymer (A) having one or more reactive silicon groups with the filler (E) (Example 1) exhibited an excellent curability. However, the cases where the Lewis acid derivative (B), the amine compound (C), or the compound (D) having a reactive silicon group was not used (Comparative Examples 1 to 3) did not exhibit excellent curability.

Example 2 and Comparative Example 4

In accordance with each formulation shown in Table 3, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%.

A part of the composition was kneaded with the spatula, and the period until the viscous liquid crystal turned to a rubbery elastomer, which was defined as the gelation period, was measured as the curing period. The results are shown in Table 3.

TABLE 3

| Composition (parts by weight) | | Example 2 | Comparative Example 4 |
|---|---|---|---|
| Main agent ((A) + (E)) | Main agent 1 | [1] 297 | [1] 297 |
| Lewis acid derivative (B) + Amine compound (C) | BF$_3$ monoethylamine complex solution[1] | [3] 2 | [2] 2 |
| Amine compound (C) | DBU[2] | [4] 2 | [3] 2 |
| Compound (D) having a reactive silicon group | Vinyltrimethoxysilane | [2] 10 | |
| Curability | Gelation period | 1 hour | >5 hours |
| Surface state of cured product | | Large tackiness | — |

Each sequence of [1], [2], [3] and [4] denotes that the corresponding components were mixed in accordance with the sequence.
[1]50% by weight solution in methanol
[2]1,8-diazabicyclo[5.4.0]-7-undecene As is understood from Table 3, the same results were obtained even when the kind(s) of the Lewis acid and/or derivative thereof (B) was/were changed (Example 2 exhibited excellent curability while the case where the compound (D) having a reactive silicon group was not used (Comparative Example 4) did not exhibit excellent curability.

Examples 3 and 4

In accordance with each formulation shown in Table 4, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%. A part of the composition was kneaded with the spatula, and the period until the viscous liquid crystal turned to a rubbery elastomer, which was defined as the gelation period, was measured as the curing period. The results are shown in Table 4.

TABLE 4

| Composition (parts by weight) | | Example 3 | Example 4 |
|---|---|---|---|
| Main agent ((A) + (E)) | Main agent 1 | [1] 297 | [1] 297 |
| Lewis acid derivative (B) | BF$_3$ diethyl ether complex solution[1] | [3] 2 | [3] 2 |
| Amine compound (C) | DBU[2] | | [4] 2 |
| | 1-Phenylguanidine solution[3] | [4] 10 | |
| Compound (D) having a reactive silicon group | Vinyltrimethoxysilane | [2] 10 | |
| | n-Hexyltrimethoxysilane | | [2] 14 |
| Curability | Gelation period | 30 minutes | 3 hours |
| Surface state of cured product | | Good | Large tackiness |

Each sequence of [1], [2], [3] and [4] denotes that the corresponding components were mixed in accordance with this sequence.
[1]50% by weight solution in THF
[2]1,8-diazabicyclo[5.4.0]-7-undecene
[3]50% by weight solution in methanol As is understood from Table 4, excellent curability was also exhibited in the case of using various amine compounds (C) and compounds (D) having a reactive silicon group. In the case of using 1-phenylguanidine, which is an aryl-substituted guanidine compound, as the amine compound (C), the surface state of the resultant cured product was good.

Examples 5 to 9

In accordance with the formulation shown in Table 5, the following were mixed with each other: the polymer (A1) yielded in Synthesis Example 1 as a polymer (A) having one or more reactive silicon groups; filler shown in Table 5 as filler (E); and a plasticizer and a thixotropic agent as other components. The components were kneaded with a three-axis paint roll to prepare a main agent 2.

TABLE 5

| Composition (parts by weight) | | Main agent 2 |
|---|---|---|
| Polymer (A) | Polymer (A1) | 100 |
| Filler (E) | WHITON[1] | 120 |
| | TIPAQUE R820[2] | 20 |
| Plasticizer | Actcol P23[3] | 55 |
| Thixotropic agent | DISPARLON 6500[4] | 2 |

[1]Surface-untreated ground calcium carbonate (manufactured by Shiraishi Calcium Kaisha, Ltd.)
[2]Titanium oxide (manufactured by Ishihara Sangyo Kaisha, Ltd.)
[3]PPG 3000 (manufactured by Takeda Pharmaceutical Company Limited)
[4]Aliphatic acid amide wax (manufactured by Kusumoto Chemicals, Ltd.)

At room temperature, 100 parts by weight of vinyltrimethoxysilane as a compound (D) having a reactive silicon group and 10 parts by weight of a diethyl ether complex of BF$_3$ as a Lewis acid and/or derivative thereof (B) were weighed out, and taken into a glass vessel. The components were stirred and mixed with each other to yield a composition (BD1).

At room temperature, 140 parts by weight of n-hexyltrimethoxysilane as a compound (D) having a reactive silicon group and 10 parts by weight of a diethyl ether complex of BF$_3$ as a Lewis acid and/or derivative thereof (B) were weighed out, and taken into a glass vessel. The components were stirred and mixed with each other to yield a composition (BD2).

At room temperature, 140 parts by weight of n-hexyltrimethoxysilane as a compound (D) having a reactive silicon group and 20 parts by weight of a 50% by weight solution of a monoethylamine complex of $BF_3$ in methanol as a Lewis acid and/or derivative thereof (B) were weighed out, and taken into a glass vessel. The components were stirred and mixed with each other, and then heated at 50° C. for 2 days to yield a composition (BD3).

In accordance with each formulation shown in Table 6, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%. A part of the composition was kneaded with the spatula, and the period until the viscous liquid crystal turned to a rubbery elastomer, which was defined as the gelation period, was measured as the curing period. The results are shown in Table 6.

TABLE 6

| Composition (parts by weight) | | Example 5 | Example 6 | Example 7 | Example 8 | Example 9 |
|---|---|---|---|---|---|---|
| Main agent ((A) + (E)) | Main agent 1 | [1] 297 | [1] 297 | [1] 297 | | [1] 297 |
| | Main agent 2 | | | | [1] 297 | |
| Composition ((B) + (D)) | Composition (BD1) | [2] 11 | | | [2] 5 | [2] 10 |
| | Composition (BD2) | | [2] 15 | | | |
| | Composition (BD3) | | | [2] 15 | | |
| Amine compound (C) | DBU[1] | [3] 2 | [3] 2 | [3] 2 | [3] 2 | |
| | 1-Phenylguanidine solution[2] | | | | | [3] 10 |
| Curability | Gelation period | 5 minutes | 15 minutes | 16 minutes | 2 minutes | 25 minutes |
| | Surface state of cured product | Large tackiness | Large tackiness | Large tackiness | Large tackiness | Good |

Each sequence of [1], [2], and [3] denotes that the corresponding components were mixed in accordance with this sequence.
[1]1,8-diazabicyclo[5.4.0]-7-undecene
[2]50% by weight solution in methanol As is understood from Table 6, also in the case of using the composition obtained by mixing the Lewis acid and/or derivative thereof (B) with the compound (D) having a reactive silicon group beforehand, curability was exhibited which was as good as or more excellent than curabilities of the compositions each obtained without mixing the Lewis acid and/or derivative thereof (B) with the compound (D) having a reactive silicon group beforehand (Examples 1 to 4). Even when the kind of the filler (E) was changed, excellent curability was exhibited. Furthermore, in the case of using 1-phenylguanidine, which is an aryl-substituted guanidine compound, as the amine compound (C), the surface state of the resultant cured product was good.

Examples 10 and 11

The main agent 1 shown in Table 1 was used, and in accordance with the formulation shown in Table 7, the following were mixed therewith to prepare a main agent 3: an antioxidant, an ultraviolet absorbent, and a compound (D) having a reactive silicon group.

TABLE 7

| Composition (parts by weight) | | Main agent 3 |
|---|---|---|
| Main agent ((A) + (E)) | Main agent 1 | 297 |
| Ultraviolet absorbent | TINUVIN 327[1] | 1 |
| Light stabilizer | SANOL LS-770[2] | 1 |

TABLE 7-continued

| Composition (parts by weight) | | Main agent 3 |
|---|---|---|
| Compound (D) having a reactive silicon group | A1120[3] | 3 |

[1]2-(3,5-Di-t-butyl-2-hydroxyphenyl)-5-chlorobenzotriazole (manufactured by Ciba Specialty Chemicals Inc.)
[2]Bis(2,2,6,6-tetramethyl-4-piperidyl) sebacate (manufactured by Daiichi Sankyo Company, Limited))
[3]-(2-Aminoethyl)aminopropyltrimethoxysilane (manufactured by Dow Corning Toray Co., Ltd.)

In accordance with each formulation shown in Table 8, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%. A part of the composition was kneaded with the spatula, and the period until the viscous liquid crystal turned to a rubbery elastomer, which was defined as the gelation period, was measured as the curing period. The results are shown in Table 8.

TABLE 8

| Composition (parts by weight) | | Example 10 | Example 11 |
|---|---|---|---|
| Main agent ((A) + (D) + (E)) | Main agent 3 | [1] 302 | [1] 302 |
| Lewis acid derivative (B) | $BF_3$ diethyl ether complex solution[1] | [3] 4 | |
| | A-1115[2] | | [3] 5 |
| Amine compound (C) | 1-Phenylguanidine solution[3] | [4] 6 | [4] 10 |
| Compound (D) having a reactive silicon group | Vinyltrimethoxysilane | [2] 2 | [2] 2 |
| Curability | Gelation period | 12 minutes | 44 minutes |
| | Surface state of cured product | Good | Good |

Each sequence of [1], [2], [3] and [4] denotes that the corresponding components were mixed in accordance with this sequence.
[1]50% by weight solution in THF
[2]ANCHOR 1115 (manufactured by Air Products and Chemicals, Inc.)
[3]50% by weight solution in methanol As is understood from Table 8, excellent curability was also exhibited in the case of adding additives such as an antioxidant to the curable composition containing the polymer (A) having one or more reactive silicon groups, the Lewis acid derivative (B), the amine compound (C), the compound (D) having a reactive silicon group, and the filler (E).

Examples 12 to 14

At room temperature, 100 parts by weight of vinyltrimethoxysilane as a compound (D) having a reactive silicon group and 35 parts by weight of a diethyl ether complex of $BF_3$ as a Lewis acid and/or derivative thereof (B) were weighed out, and taken into a glass vessel. The components were stirred and mixed with each other to yield a composition (BD4).

In accordance with each formulation shown in Table 9, under conditions of a temperature of 23° C. and a relative humidity of 50%, individual components were weighed out and taken into a metallic can, and a spatula was used to knead the components sufficiently for 1 minute. The time when the kneading was ended was defined as the curing starting time, and the metallic can was allowed to stand still under conditions of a temperature of 23° C. and a relative humidity of 50%. A part of the composition was kneaded with the spatula, and the period until the viscous liquid crystal turned to a rubbery elastomer, which was defined as the gelation period, was measured as the curing period. The results are shown in Table 9.

maceutical Company Limited); 2 parts by weight of a thixotropy supplier (trade name: DISPARLON #6500, manufactured by Kusumoto Chemicals, Ltd.); 1 part by weight of an ultraviolet absorbent (trade name: TINUVIN 327 manufactured by Ciba Specialty Chemicals Inc.); and 1 part by weight of a light stabilizer (trade name: SANOL LS770 manufactured by Daiichi Sankyo Company, Limited). The individual components were weighed out, and mixed with each other and sufficiently kneaded. A three-axis paint roll was then used to disperse the components. Thereafter, the resultant was dehydrated at 120° C. under reduced pressure for 2 hours, and then cooled to 50° C. or lower. Thereafter, thereto were added 2 parts by weight of vinyltrimethoxysilane (trade name: A-171, manufactured by Dow Coring Toray Co., Ltd.) and 3 parts by weight of -(2-aminoethyl)aminopropyltrimethoxysilane (trade name: A-1120 manufactured by Dow Coring Toray Co., Ltd.) as a compound (D) having a reactive silicon group. The components were then kneaded, and further thereto were added 4 parts by weight of a diethyl ether complex of $BF_3$ as a Lewis acid and/or derivative thereof (B), and then the components were kneaded. Finally, thereto was added a solution wherein 3 parts by weight of 1-phenylguanidine as an amine compound (C) were dissolved in 4.5 parts by weight of a plasticizer (trade name: Actcol P23,

TABLE 9

| Composition (parts by weight) | | Example 12 | Example 13 | Example 14 |
|---|---|---|---|---|
| Main agent ((A) + (D) + (E)) | Main agent 3 | [1] 302 | [1] 302 | [1] 302 |
| Composition ((B) + (D)) | Composition (BD1) | [2] 7 | [2] 10 | |
| | Composition (BD4) | | | [2] 10 |
| Amine compound (C) | DBU[1] | [3] 2 | | |
| | 1-Phenylguanidine solution[2] | | [3] 10 | [3] 4 |
| Curability | Gelation period | 12 minutes | 30 minutes | 15 minutes |
| | Surface state of cured product | Large tackiness | Good | Good |

Each sequence of [1], [2] and [3] denotes that the corresponding components were mixed in accordance with this sequence.
[1]1,8-diazabicyclo[5.4.0]-7-undecene
[2]50% by weight solution in methanol As is understood from Table 9, also in the case of adding additives such as an antioxidant, excellent curability was exhibited, in the same manner as in the compositions obtained without mixing the Lewis acid and/or derivative thereof (B) with the compound (D) having a reactive silicon group beforehand (Examples 10 to 11), even by the use of the composition obtained by mixing the Lewis acid and/or derivative thereof (B) with the compound (D) having a reactive silicon group beforehand. Furthermore, in the case of using 1-phenylguanidine, which is an aryl-substituted guanidine compound, as the amine compound (C), the surface state of the resultant cured product was good.

Example 15

The following were used: 100 parts by weight of the polymer (A1) yielded in Synthesis Example 1 as a polymer (A) having one or more reactive silicon groups; 120 parts by weight of surface-treated colloidal calcium carbonate (trade name: HAKUENKA CCR, manufactured by Shiraishi Kogyo Kaisha, Ltd.), and 20 parts by weight of titanium oxide (trade name: TIPAQUE R-820, manufactured by Ishihara Sangyo Kaisha, Ltd.) as fillers (E); 50.5 parts by weight of a plasticizer (trade name: Actcol P23, manufactured by Takeda Pharmanufactured by Takeda Pharmaceutical Company Limited), and then the components were kneaded in a state where water was not substantially present. The resultant was air-tightly put into a moisture-proof cartridge to yield a one-part-type curable composition.

The resultant one-part-type curable composition was stored at 23° C. for one week, and then put out from the cartridge and stretched onto a metal to give a thickness of about 3 mm under conditions of a constant temperature of 23° C. and a constant humidity of 50%. The surface of the composition was touched with the tip of a spatula, and the time until the composition came not to adhere onto the spatula was measured as the skin formation time. As a result, the time was 15 minutes.

From this matter, it was understood that the one-part-type curable composition made of the composition of the present invention also exhibits quick curability.

Example 16

The following were used: 100 parts by weight of the polymer (A1) yielded in Synthesis Example 1 as a polymer (A) having one or more reactive silicon groups; 120 parts by weight of surface-treated colloidal calcium carbonate (trade name: HAKUENKA CCR, manufactured by Shiraishi Kogyo Kaisha, Ltd.), and 20 parts by weight of titanium oxide (trade name: TIPAQUE R-820, manufactured by Ishihara Sangyo Kaisha, Ltd.) as fillers (E); 55 parts by weight of a plasticizer (trade name: Actcol P23, manufactured by Takeda Pharmaceutical Company Limited); 2 parts by weight of a thixotropy supplier (trade name: DISPARLON #6500, manufactured by Kusumoto Chemicals, Ltd.); 1 part by weight of an ultraviolet absorbent (trade name: TINUVIN 327 manufactured by Ciba Specialty Chemicals Inc.); and 1 part by weight of a light stabilizer (trade name: SANOL LS770 manufactured by Daiichi Sankyo Company, Limited). The individual components were weighed out, and mixed with each other and sufficiently kneaded. A three-axis paint roll was then used to disperse the components. Thereafter, the resultant was dehydrated at 120° C. under reduced pressure for 2 hours, and then cooled to 50° C. or lower. Thereafter, thereto were added 3 parts by weight of -(2-aminoethyl)aminopropyltrimethoxysilane (trade name: A-1120 manufactured by Dow Coring Toray Co., Ltd.) as an adhesion imparting agent, 7 parts by weight of the "BD4" used in Example 14 as a composition obtained by mixing a Lewis acid and/or derivative thereof (B) with a compound (D) having a reactive silicon group, and 10 parts by weight of a 50% by weight solution of 1-phenylguanidine in methanol as an amine compound (C). The components were kneaded in a state where water was not substantially present. The resultant was air-tightly put into a moisture-proof cartridge to yield a one-part-type curable composition.

The resultant one-part-type curable composition was stored at 23° C. for one week, and then put out from the cartridge and stretched onto a metal to give a thickness of about 3 mm under conditions of a constant temperature of 23° C. and a constant humidity of 50%. The surface of the composition was touched with the tip of a spatula, and the time until the composition came not to adhere onto the spatula was measured as the skin formation time. As a result, the time was 24 minutes.

From this matter, it was understood that the one-part-type curable composition made of the composition of the present invention exhibits quick curability also in the case of mixing its individual components with each other by the method including a step of mixing the composition obtained by mixing a Lewis acid and/or derivative thereof (B) with a compound (D) having a reactive silicon group with components containing filler (E).

Examples 17 to 26

The following were used: 100 parts by weight of the polymer (A1) yielded in Synthesis Example 1 as a polymer (A) having one or more reactive silicon groups; 120 parts by weight of surface-treated colloidal calcium carbonate (trade name: HAKUENKA CCR, manufactured by Shiraishi Kogyo Kaisha, Ltd.), and 20 parts by weight of titanium oxide (trade name: TIPAQUE, R-820, manufactured by Ishihara Sangyo Kaisha, Ltd.) as fillers (E); 55 parts by weight of a plasticizer (trade name: Actcol P23, manufactured by Takeda Pharmaceutical Company Limited); 2 parts by weight of a thixotropy supplier (trade name: DISPARLON #6500, manufactured by Kusumoto Chemicals, Ltd.); 1 part by weight of an ultraviolet absorbent (trade name: TINUVIN 327 manufactured by Ciba Specialty Chemicals Inc.); and 1 part by weight of a light stabilizer (trade name: SANOL LS770 manufactured by Daiichi Sankyo Company, Limited). The individual components were weighed out, and mixed with each other and sufficiently kneaded. A three-axis paint roll was then used to disperse the components. Thereafter, the resultant was dehydrated at 120° C. under reduced pressure for 2 hours, and then cooled to 50° C. or lower. Thereafter, thereto were added 2 parts by weight of vinyltrimethoxysilane (trade name: A-171, manufactured by Dow Coring Toray Co., Ltd.) and 3 parts by weight of -(2-aminoethyl)aminopropyltrimethoxysilane (trade name: A-1120, manufactured by Dow Coring Toray Co., Ltd.) as a compound (D) having a reactive silicon group. The components were kneaded and then the resultant was named a main agent 4.

To this main agent 4 was/were added a Lewis acid and/or derivative thereof (B), and an amine compound (C) in accordance with each formulation shown in Table 10, and the components were kneaded in a state where water was not substantially present. The resultant was air-tightly put into a moisture-proof cartridge to yield a one-part-type curable composition.

The resultant one-part-type curable composition was stretched, immediately or after cured at a given temperature for a given period as described in Table 10, onto a metal to give a thickness of about 3 mm, under conditions of a constant temperature of 23° C. and a constant humidity of 50%. The surface of the composition was touched with the tip of a spatula, and the time until the composition came not to adhere onto the spatula was measured as the skin formation time. The results are shown in Table 10.

TABLE 10

| Composition (parts by weight) | | Example | | | | | | | | | |
|---|---|---|---|---|---|---|---|---|---|---|---|
| | | 17 | 18 | 19 | 20 | 21 | 22 | 23 | 24 | 25 | 26 |
| Main agent ((A) + (D) + (E)) | Main agent 4 | 304 | 304 | 304 | 304 | 304 | 304 | 304 | 304 | 304 | 304 |
| Lewis acid derivative (B) + Amine compound (C) | BF$_3$ monoethylamine complex solution[1] | 12 | 8 | 4 | 4 | 4 | 2.6 | 2.6 | | | |
| | BF$_3$ piperidine complex[2] | | | | | | | | 2.7 | 2.7 | 2.7 |
| Amine compound (C) | 1-Phenyl-guanidine solution[3] | | 12 | 1.6 | 1.6 | 0.4 | | | | | |
| | DBU[4] | 6 | | | | | | | | | |
| Curing period | | 0 hour | 0 hour | 6 hours | 40 days | 6 hours | 2 hours | 2 hours | 7 hours | 10 days | 7 hours |
| Curing temperature | | 23 C. | 23 C. | 23 C. | 23 C. | 50 C. | 23 C. | 50 C. | 23 C. | 23 C. | 50 C. |

TABLE 10-continued

| Composition (parts by weight) | | Example | | | | | | | | |
|---|---|---|---|---|---|---|---|---|---|---|
| | | 17 | 18 | 19 | 20 | 21 | 22 | 23 | 24 | 25 | 26 |
| Curability | Gelation period | 5 minutes | 5 minutes | >2 hours | 20 minutes | 30 minutes | >2 hours | 60 minutes | >2 hours | 20 minutes | 20 minutes |

[1] 50% by weight solution in methanol
[2] addition of the complex heated and melted in an oven at 60° C.
[3] 50% by weight solution in methanol
[4] 1,8-diazabicyclo[5.4.0]-7-undecene From this matter, it was understood that when the one-part-type curable composition made of the composition according to the present invention is subjected to a predetermined curing, sufficient curability is exhibited even when a component (B) or component (C) is used in a smaller amount.

Example 27

100 parts by weight of the polymer (A1) yielded in Synthesis Example 1 as a polymer (A) having one or more reactive silicon groups, and 1 part by weight of a diethyl ether complex of $BF_3$ as a Lewis acid and/or derivative thereof (B) were added, and then mixed with each other, and then the mixture was allowed to stand still at 23° C. for 10 minutes. The following were each weighed out: 120 parts by weight of surface-treated colloidal calcium carbonate (trade name: HAKUENKA CCR, manufactured by Shiraishi Kogyo Kaisha, Ltd.), and 20 parts by weight of titanium oxide (trade name: TIPAQUE, R-820, manufactured by Ishihara Sangyo Kaisha, Ltd.) as fillers (E); 55 parts by weight of a plasticizer (trade name: Actcol P23, manufactured by Takeda Pharmaceutical Company Limited); and 2 parts by weight of a thixotropy supplier (trade name: DISPARLON #6500, manufactured by Kusumoto Chemicals, Ltd.). The weighed components were mixed with the mixture obtained as described above and sufficiently kneaded. A three-axis paint roll was then used to disperse the components. 10 parts by weight of vinyltrimethoxysilane (trade name: A-171, manufactured by Dow Coring Toray Co., Ltd.) as a compound (D) having a reactive silica group were weighed out, and mixed with the mixture obtained as described above. Furthermore, 2 parts by weight of DBU as an amine compound (C) were weighed out, and mixed with the mixture obtained as described above to yield a curable composition.

The resultant one-part-type curable composition was immediately stretched onto a metal to give a thickness of about 3 mm under conditions of a constant temperature of 23° C. and a constant humidity of 50%. The surface of the composition was touched with the tip of a spatula, and the time until the composition came not to adhere onto the spatula was measured as the skin formation time. As a result, the skin formation period was within one minute.

From this matter, it was understood that the curable composition made of the composition according to the present invention exhibits high curability in the case of preparing the composition by the method of mixing components containing the polymer (A) having one or more reactive silicon groups and the Lewis acid and/or derivative thereof (B) with each other beforehand (in the absence of any filler (E)), and then mixing this mixture with the filler (E) and other components.

The invention claimed is:

1. A method of making a curable composition, comprising, as constituents, a polymer (A) having one or more reactive silicon groups on average per molecule thereof, the reactive silicon group(s) being (each) a group which can be crosslinked by forming a siloxane bond, wherein the reactive silicon group(s) present in the polymer (A) is/are (each) a reactive silicon group represented by the general formula (2):

$$—SiR^3{}_{3-b}Y_b \qquad (2)$$

wherein $R^3$ or $R^3$s, the number of which is (3-b), is/are (each independently) a hydrocarbon group having 1 to 20 carbon atoms, Y or Ys, the number of which is b, is/are (each independently) at least one selected from the group consisting of a hydroxyl group, an alkoxy group, an alkenyloxy group, an acyloxy group, a phenoxy group, and a siloxy group represented by $R^2{}_3SiO$— wherein three $R^2$s are each independently a hydrocarbon group having 1 to 20 carbon atoms, and b is any one of 1, 2 and 3;

$BF_3$ and/or derivative thereof, and the amount thereof is from 0.5 to 2 parts by weight based on 100 parts by weight of the polymer (A);

an amine heterocyclic compound, and the amount thereof is from 0.1 to 10 parts by weight based on 100 parts by weight of the polymer (A);

vinyltrimethoxysilane, and the amount thereof is from 1 to 10 parts by weight based on 100 parts by weight of the polymer (A);

and surface treated colloidal calcium carbonate and/or titanium oxide, and the amount thereof is from 10 to 200 parts by weight based on 100 parts by weight of the polymer (A), and;

wherein at least the polymer (A) having one or more reactive silicon groups and/or the vinyltrimethoxysilane, and the $BF_3$ and/or derivative thereof are mixed with each other in advance, and then mixing this mixture with other constituent(s) containing at least the surface treated colloidal calcium carbonate and/or titanium oxide.

2. A method of making a curable composition, comprising, as constituents, a polymer (A) having one or more reactive silicon groups on average per molecule thereof, the reactive silicon group(s) being (each) a group which can be crosslinked by forming a siloxane bond, wherein the reactive silicon group(s) present in the polymer (A) is/are (each) a reactive silicon group represented by the general formula (2):

$$—SiR^3{}_{3-b}Y_b \qquad (2)$$

wherein $R^3$ or $R^3$s, the number of which is (3-b), is/are (each independently) a hydrocarbon group having 1 to 20 carbon atoms, Y or Ys, the number of which is b, is/are (each independently) at least one selected from the group consisting of a hydroxyl group, an alkoxy group, an alkenyloxy group, an acyloxy group, a phenoxy group, and a siloxy group represented by $R^2{}_3SiO$— wherein three $R^2$s are each independently a hydrocarbon group having 1 to 20 carbon atoms, and b is any one of 1, 2 and 3;

BF$_3$ and/or derivative thereof, and the amount thereof is from 0.5 to 2 parts by weight based on 100 parts by weight of the polymer (A);

an amine heterocyclic compound, and the amount thereof is from 0.1 to 10 parts by weight based on 100 parts by weight of the polymer (A);

vinyltrimethoxysilane, and the amount thereof is from 1 to 10 parts by weight based on 100 parts by weight of the polymer (A);

and surface treated colloidal calcium carbonate and/or titanium oxide, and the amount thereof is from 10 to 200 parts by weight based on 100 parts by weight of the polymer (A), and;

wherein at least the polymer (A) having one or more reactive silicon groups and/or the vinyltrimethoxysilane, and the BF$_3$ and/or derivative thereof are mixed with each other in advance in the absence of the surface treated colloidal calcium carbonate and/or titanium oxide, and then mixing this mixture with other constituent(s) containing at least the surface treated colloidal calcium carbonate and/or titanium oxide.

3. The method of making the curable composition pursuant to claim 1, wherein b in the general formula (2) is 2.

4. The method of making the curable composition pursuant to claim 1, wherein Y(s) in the general formula (2) is/are (each) an alkoxy group.

5. The method of making the curable composition pursuant to claim 1, wherein Y(s) in the general formula (2) is/are (each) a methoxy group.

6. The method of making the curable composition pursuant to claim 1, wherein the molecular weight of the vinyltrimethoxysilane is 3,000 or less.

7. The method of making the curable composition pursuant to claim 1, wherein the surface treated colloidal calcium carbonate and/or titanium oxide is precipitated calcium carbonate which is surface-treated with an aliphatic acid and/or an aliphatic acid salt.

8. The method of making the curable composition pursuant to claim 1, which is produced through a process containing a step of heating the curable composition at a temperature of 40° C. or higher.

9. The method of making the curable composition pursuant to claim 2, wherein b in the general formula (2) is 2.

10. The method of making the curable composition pursuant to claim 2, wherein Y(s) in the general formula (2) is/are (each) an alkoxy group.

11. The method of making the curable composition pursuant to claim 2, wherein Y(s) in the general formula (2) is/are (each) a methoxy group.

12. The method of making the curable composition pursuant to claim 2, wherein the molecular weight of the vinyltrimethoxysilane is 3,000 or less.

13. The method of making the curable composition pursuant to claim 2, wherein the surface treated colloidal calcium carbonate and/or titanium oxide is precipitated calcium carbonate which is surface-treated with an aliphatic acid and/or an aliphatic acid salt.

14. The method of making the curable composition pursuant to claim 2, which is produced through a process containing a step of heating the curable composition at a temperature of 40° C. or higher.

* * * * *